(12) United States Patent
Wagreich

(10) Patent No.: US 9,533,760 B1
(45) Date of Patent: *Jan. 3, 2017

(54) IMAGE MONITORING AND DISPLAY FROM UNMANNED VEHICLE

(71) Applicant: Crane-Cohasset Holdings, LLC, Encino, CA (US)

(72) Inventor: David Wagreich, Los Angeles, CA (US)

(73) Assignee: CRANE-COHASSET HOLDINGS, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/064,533

(22) Filed: Mar. 8, 2016

Related U.S. Application Data

(63) Continuation of application No. 14/036,669, filed on Sep. 25, 2013, now abandoned, and a continuation of application No. 13/847,161, filed on Mar. 19, 2013, now Pat. No. 9,350,954.

(60) Provisional application No. 61/685,539, filed on Mar. 20, 2012.

(51) Int. Cl.
| | |
|---|---|
| *H04N 7/18* | (2006.01) |
| *B64C 39/02* | (2006.01) |
| *H04N 5/232* | (2006.01) |
| *H04N 5/247* | (2006.01) |
| *G06K 9/00* | (2006.01) |
| *B64D 47/08* | (2006.01) |

(52) U.S. Cl.
CPC ............ *B64C 39/024* (2013.01); *B64D 47/08* (2013.01); *G06K 9/0063* (2013.01); *H04N 5/23238* (2013.01); *H04N 5/23293* (2013.01); *H04N 5/247* (2013.01); *H04N 7/181* (2013.01); *B64C 2201/127* (2013.01); *B64C 2201/146* (2013.01)

(58) Field of Classification Search
CPC ....... G01C 11/025; G01C 11/02; H04N 7/005; H04N 7/18; H04N 7/181
USPC ........................................................ 348/144
See application file for complete search history.

(56) References Cited

U.S. PATENT DOCUMENTS

| | | |
|---|---|---|
| 4,355,328 A | 10/1982 | Kulik |
| 4,772,942 A | 9/1988 | Tuck |
| 5,034,759 A | 7/1991 | Watson |

(Continued)

FOREIGN PATENT DOCUMENTS

| | | |
|---|---|---|
| EP | 2828148 | 6/2015 |
| WO | 2011/034645 A1 | 3/2011 |

(Continued)

OTHER PUBLICATIONS

Kerns et al, Unmanned Aircraft Capture and Control via GPS Spoofing, Jun. 15, 2013.*

(Continued)

*Primary Examiner* — Shan Elahi
(74) *Attorney, Agent, or Firm* — Kilpatrick Townsend & Stockton LLP

(57) ABSTRACT

This invention relates to capturing and displaying images and/or data received from a manned, or, more typically, an unmanned aerial drone. More particularly, the invention relates to a system of sensors mounted on an aerial drone and display systems in addition to transmission and reception components associated with the sensors and display systems respectively whereby images and/or data captured by the sensors can be transmitted to, received by, and viewed on single and multiple monitor display systems.

20 Claims, 24 Drawing Sheets

(56) References Cited

U.S. PATENT DOCUMENTS

| | | | |
|---|---|---|---|
| 5,103,306 A | 4/1992 | Weiman et al. | |
| 5,130,794 A | 7/1992 | Ritchey | |
| 5,240,207 A | 8/1993 | Eiband et al. | |
| 6,304,290 B1 | 10/2001 | Bailly | |
| 6,781,606 B2 | 8/2004 | Jouppi | |
| 7,826,839 B1* | 11/2010 | Nicholas | H04K 3/28 342/14 |
| 8,098,283 B2* | 1/2012 | Ramsay | G06Q 30/0603 348/130 |
| 8,903,568 B1 | 12/2014 | Wang et al. | |
| 9,185,290 B1 | 11/2015 | Lapstun et al. | |
| 9,213,333 B2 | 12/2015 | Harrison et al. | |
| D756,842 S * | 5/2016 | Ashjaee | D12/16.1 |
| 9,350,954 B2* | 5/2016 | Wagreich | G05D 1/0038 |
| 9,356,727 B2* | 5/2016 | Immendorf | H04K 3/40 |
| 2002/0196339 A1 | 12/2002 | Heafitz | |
| 2004/0066449 A1 | 4/2004 | Givon | |
| 2004/0207560 A1* | 10/2004 | Knapp | H01Q 1/287 343/705 |
| 2006/0077255 A1 | 4/2006 | Cheng | |
| 2006/0083501 A1 | 4/2006 | Segal et al. | |
| 2006/0146132 A1 | 7/2006 | Mayerson | |
| 2006/0200382 A1 | 9/2006 | Arutunian et al. | |
| 2007/0088709 A1 | 4/2007 | Bailey et al. | |
| 2007/0096446 A1 | 5/2007 | Breed | |
| 2007/0097206 A1 | 5/2007 | Houvener et al. | |
| 2007/0268155 A1 | 11/2007 | Holmes et al. | |
| 2008/0043020 A1 | 2/2008 | Snow et al. | |
| 2008/0158256 A1 | 7/2008 | Russell et al. | |
| 2009/0015674 A1* | 1/2009 | Alley | H04N 7/185 348/144 |
| 2009/0045290 A1 | 2/2009 | Small et al. | |
| 2009/0195652 A1 | 8/2009 | Gal | |
| 2009/0232415 A1 | 9/2009 | Uyttendaele et al. | |
| 2009/0284644 A1 | 11/2009 | McKaughan et al. | |
| 2010/0013923 A1 | 1/2010 | Yakura | |
| 2010/0141762 A1* | 6/2010 | Siann | H04N 7/185 348/143 |
| 2010/0299067 A1* | 11/2010 | McCollough | G08G 5/04 701/301 |
| 2010/0302359 A1 | 12/2010 | Adams et al. | |
| 2010/0329542 A1 | 12/2010 | Ramalingam et al. | |
| 2011/0064312 A1 | 3/2011 | Janky et al. | |
| 2011/0134209 A1 | 6/2011 | Schmidt | |
| 2011/0134243 A1* | 6/2011 | Siann | H04N 7/185 348/143 |
| 2011/0134249 A1 | 6/2011 | Wood et al. | |
| 2011/0169945 A1 | 7/2011 | Petrini et al. | |
| 2011/0184647 A1 | 7/2011 | Yoel et al. | |
| 2011/0234796 A1* | 9/2011 | Taber | H04N 7/18 348/144 |
| 2011/0249100 A1 | 10/2011 | Jayaram et al. | |
| 2011/0291918 A1 | 12/2011 | Surber et al. | |
| 2012/0033851 A1 | 2/2012 | Chen et al. | |
| 2012/0043411 A1* | 2/2012 | Beck | B64C 39/024 244/3.24 |
| 2012/0050524 A1* | 3/2012 | Rinner | G06T 7/0028 348/117 |
| 2012/0050525 A1* | 3/2012 | Rinner | G06T 7/0028 348/117 |
| 2012/0229596 A1 | 9/2012 | Rose et al. | |
| 2013/0222590 A1 | 8/2013 | O'Brien | |
| 2013/0248656 A1* | 9/2013 | Mohamadi | H04W 16/26 244/190 |
| 2014/0327733 A1 | 11/2014 | Wagreich | |
| 2014/0327770 A1 | 11/2014 | Wagreich | |
| 2015/0063202 A1* | 3/2015 | Mazzarella | H04B 7/18504 370/316 |
| 2015/0094883 A1* | 4/2015 | Peeters | B64C 19/00 701/3 |
| 2015/0367958 A1 | 12/2015 | Lapstun et al. | |
| 2016/0124435 A1* | 5/2016 | Thompson | G05D 1/0094 348/144 |

FOREIGN PATENT DOCUMENTS

| | | |
|---|---|---|
| WO | 2011/048597 A1 | 4/2011 |
| WO | 2014/007873 A2 | 1/2014 |

OTHER PUBLICATIONS

Kakaes et al, Drones and Aerial Observation: New Technologies for property rights, human rights, and global development a primer, Jul. 2015.*

Supplementary European Search Report for EP13813000 completed Nov. 2, 2015, 6 pages.

U.S. Appl. No. 13/847,161, filed Mar. 19, 2013, Non-Final Office Action mailed Jun. 30, 2015, 36 pages.

U.S. Appl. No. 13/847,161, filed Mar. 19, 2013, Notice of Allowance mailed Jan. 22, 2016, 49 pages.

U.S. Appl. No. 14/036,669, filed Sep. 25, 2013, Non-Final Office Action mailed Sep. 9, 2015, 62 pages.

International Search Report and Written Opinion for PCT/US2013/032998 dated Jan. 17, 2014 8 pages.

* cited by examiner

IMAGE MONITORING AND DISPLAY FROM UNMANNED VEHICLE

CROSS-REFERENCES TO RELATED APPLICATIONS

This application is a continuation application of U.S. patent application Ser. No. 14/036,669 filed on Sep. 25, 2013 that is a continuation-in-part application of U.S. patent application Ser. No. 13/847,161 filed Mar. 19, 2013 that claims the benefit of U.S. Provisional Patent Application No. 61/685,539 filed Mar. 20, 2012, the contents of all of which are incorporated by reference herein in their entirety. This application is also a continuation application of U.S. patent application Ser. No. 13/847,161 filed Mar. 19, 2013 that claims the benefit of U.S. Provisional Patent Application No. 61/685,539 filed Mar. 20, 2012, the contents of all of which are incorporated by reference herein in their entirety.

FIELD OF THE INVENTION

The field of invention relates to capturing and displaying images received from cameras attached to an unmanned or manned aerial vehicle.

BACKGROUND OF THE INVENTION

Operators of single lens, conventionally configured camera and monitoring device combinations for aerial photography on manned or unmanned aerial vehicles experience limited field of view issues. Using a single lens, conventionally-configured camera and monitor combination creates a relatively narrow perspective that may hinder a pilot's ability to ascertain an object's true location and proximity to the vehicle due to a lack of ambient visual cues. Thus, pilots or operators cannot make the accurate attitude and control adjustments necessary to capture the desired images.

SUMMARY OF THE INVENTION

This invention relates to capturing and displaying images and/or data received from a manned, or, more typically, an unmanned aerial drone. More particularly, the invention relates to a system of sensors mounted on an aerial drone and display systems in addition to transmission and reception components associated with the sensors and display systems respectively whereby images and/or data captured by the sensors can be transmitted to, received by, and viewed on single and multiple monitor display systems.

One embodiment of the invention is an aerial drone for capturing video imagery under remote control. In this embodiment the aerial drone comprises a navigation system responsive to navigation commands; a first wireless receiver, in communication with the navigation system, and configured to receive navigation commands from a remote location. The aerial drone further includes a navigation imaging system comprising a plurality of navigation cameras attached to the aerial drone and positioned so as to capture navigation video from around the exterior of the aerial drone. The aerial drone also comprises a first wireless transmitter configured to transmit the navigation video to a first monitoring system at the remote location. Additionally, the aerial drone includes a payload imaging system comprising a second wireless receiver, in communication with the payload imaging system, configured to receive rotational commands from the remote location. It also comprises a rotating mount attached to the aerial drone and configured to be rotational on both horizontal and vertical axes independent of the movement of the aerial drone and configured to respond to the rotational commands received by the second wireless receiver. The aerial drone of this embodiment also includes a payload camera attached to the rotating mount configured to capture payload video and a second wireless transmitter configured to transmit the payload video to the a second monitoring system at the remote location.

Another embodiment of the present invention is a method for capturing video imagery utilizing an aerial drone under remote control. The method includes receiving navigation commands from a remote location and modifying first control parameters to navigate the aerial drone in response to the navigation commands. The method further includes capturing navigation image data from a plurality of navigation cameras attached to and positioned around the exterior of the aerial drone and transmitting the navigation image data to a first monitoring system at the remote location. The method further comprises receiving rotational commands from the remote location and, in response to the rotational commands, modifying second control parameters to move a rotating mount attached to the aerial drone so as to be rotational on both horizontal and vertical axes independent of the movement of the aerial drone. The method also includes capturing payload image data from a payload camera attached to the rotating mount; and transmitting the payload image data to a second monitoring system at the remote location.

A further embodiment of the present invention is a system for capturing video imagery utilizing an aerial drone under remote control comprising a navigation system responsive to navigation commands and a first wireless receiver, in communication with the navigation system, configured to receive navigation commands from a remote location. They system also includes a navigation imaging system comprising a plurality of navigation cameras attached to the aerial drone and positioned so as to capture navigation image data from around the exterior of the aerial drone and a first wireless transmitter configured to transmit the navigation image data. The system also includes a payload imaging system comprising a second wireless receiver, in communication with the payload imaging system, configured to receive rotational commands from the remote location. The system also includes aa rotating mount attached to the aerial drone and configured to: be rotational on both horizontal and vertical axes independent of the movement of the aerial drone and configured to respond to the rotational commands received by the second wireless receiver. The system further comprises a payload camera attached to the rotating mount configured to capture payload image data and a second wireless transmitter configured to transmit the payload image. The system also includes a first monitoring system configured to receive navigation image data and display navigation image data. The system further comprises a second monitoring system configured to receive payload image data and display payload image data. The system can further include the first monitoring system having a display for each of the plurality of navigation cameras configured to be in alignment with each of the plurality of navigation cameras Further areas of applicability of the present disclosure will become apparent from the detailed description provided hereinafter. It should be understood that the detailed description and specific examples, while indicating various embodi-

BRIEF DESCRIPTION OF THE DRAWINGS

The present disclosure is described in conjunction with the appended figures.

Figure 1:
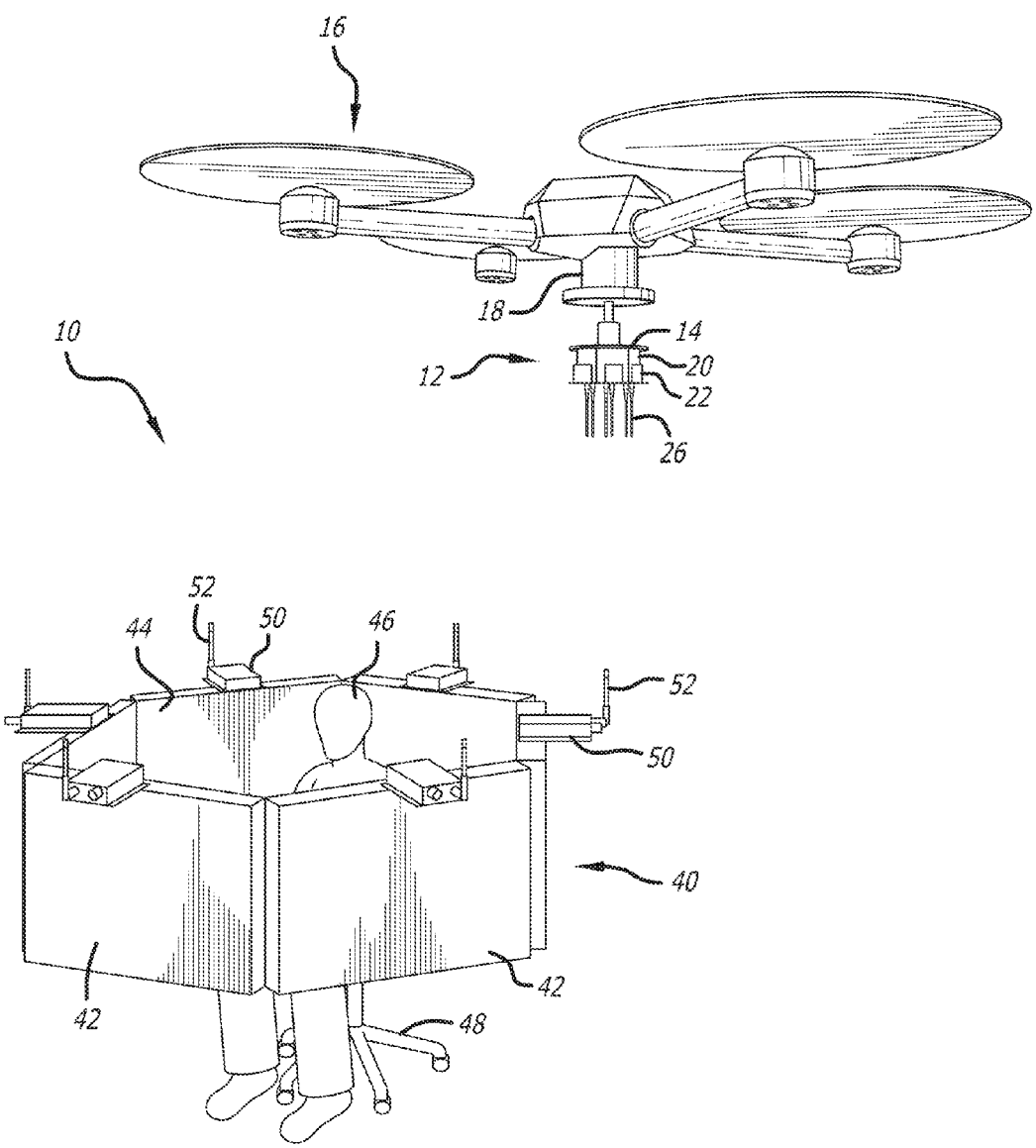
FIG. 1 is a schematic representation of an embodiment of an unmanned aerial vehicle with an image monitoring and display station.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

Image capture and display systems utilizing aerial manned or unmanned vehicles allow pilots and assistants to collect imagery and other information not easily or possibly obtained in any other manner. It should be noted that in further embodiments the first image capture component can be augmented by a second (or third or more) image capturing component. This additional system(s) can be positioned anywhere on the manned or unmanned vehicle, and can consist of a single image-capture member or multiple image-capture members. The secondary (or tertiary, etc.) component can be fixed or have an ability to be remotely articulated on any axis, by either the pilot or a secondary system operator assisting the pilot. This articulated movement can be 360 degrees in any direction. Monitoring for the second (or third, etc.) component would be positioned in a manner that is beneficial to the pilot, or operator assisting the pilot, and can be incorporated into the contiguous array view, or separated from the contiguous array view of the primary image capture and display system.

Transmission repeaters or signal amplifiers can be added to the system and placed in a location or locations that are considered to improve or boost signal quality or extend the range of the vehicle's operational area. As one example only, if a craft is flown on one side of a mountain range, with the pilot or operator's monitoring station situated on the other side of a mountain range in a position that does not facilitate a suitable line-of-sight signal transmission, a repeater and/or an amplifying device can be placed at a point of high elevation atop the mountain range to aid in the quality and strength of the signal that is being transmitted and received. A transmission repeater can also be carried aloft by another aircraft (manned or remotely-controlled), or satellite, in addition to or instead of the above situation. In instances where the repeater aircraft is unmanned, this repeater aircraft may be controlled autonomously via preprogrammed GPS or other positioning waypoint technology, or through the use of "follow me" tracking technology, where the secondary repeater aircraft automatically tracks the primary vehicle. The repeater aircraft can also be controlled manually, in real time, via commands from the vehicle pilot, the operator assisting the pilot, or another operator or pilot, using any applicable remotely-piloted aircraft command and control technology. The repeater signal links can include video downlinks from the vehicle first system multi-sensor array via the repeater to the ground station monitor display, video downlink(s) from the vehicle second system camera(s) via the repeater to the ground station monitor display(s), command and control uplinks from the ground station via the repeater to the first and second system camera controls, vehicle command and control uplink from the ground station via the repeater to the vehicle flight control computer device, vehicle command and control uplink from the ground station to the repeater aircraft flight control computer device.

The aircraft borne component of image capture and display system installation, in any of its variants, can be implemented with or without gyro stabilization, motor-driven or servo stabilization, mechanical vibration isolation, electronic image stabilization, or other types of stabilization, technology depending on the application and whether stabilization and/or a level horizon is deemed to be advantageous to the application. Both the first and second (or more) systems can moved mechanically—extended, retracted, or articulated via an armature or other supporting structure during flight—to facilitate a clear view around the aircraft, promote aerodynamic efficiency, or other operational necessity.

FIG. 1 illustrates an embodiment of an image capture and display system 10. It is noted that the capturing and display is not limited to conventional video in the visual spectrum, but embodiments can also comprise infrared, thermal, radiation, or other sensors and display mechanisms (including heat sensing or night vision cameras or sensors, LIDAR (light/radar, aka light detection and ranging) or ViDAR (video detection and ranging) systems sensors). Therefore, any reference herein to visual spectrum image and display should also be understood to encompass all other types of sensing and their respective forms of display.

The capture and display system 10 comprises a camera array 12 mounted on a frame 14 that is attached to the underside of an unmanned aerial vehicle 16. Other embodiments might comprise different aerial vehicles including manned or unmanned vehicles, fixed wing or rotorcraft, gliders, to name a few. The aerial vehicle 16 may optionally include a gyro stabilization device 18 where considered necessary or appropriate.

The camera array 12 comprises six cameras 20 mounted on the frame 14 that may be in the form of a chassis, platform or other suitable structure. The cameras 20 may be exposed, as shown in this embodiment. In other embodiments they may also be individually enclosed or enclosed in a containment structure that would make up the frame 14. Each camera or sensor has a lens 22 located on the frame 14 so as to capture a different segment of the surroundings. In the embodiment illustrated, there are six cameras 20 and each would capture images representing six approximately 60-degree segments so that the combined image encapsulates the full 360-degree view about the aerial vehicle 16. The cameras 20 are placed on the frame 14 so that there will preferably be a clear and unimpeded view of the surroundings.

Each camera 20 has an associated antenna 26 in the present embodiment that is mounted on the lower surface of the frame 14 projecting downwardly. As shown in this embodiment each antenna 26 is directly below its associated camera 20, and is configured to transmit the image from its associated camera 20 to a receiver, as will be described. In other embodiments the antenna arrangement can take other forms not specific to "downward" and "below its associated camera" as described.

The embodiment in FIG. 1 shows one antenna 26 for each camera 20 or sensor, but other embodiments my contain fewer antennae 26 than cameras 20. In such embodiments the images from one or more or all of the cameras 20 may be combined and transmitted by a single antenna to a base station where the combined signal will be received and separated into its individual component parts so as to recreate the 360-degree (or other spectrum) view captured by the plurality of the cameras 20.

The present embodiment also has a base monitoring or display station 40. This station 40 comprises six monitors 42 arranged relative to each other to form a generally hexagonal shape, and defining an interior space 44 which can accommodate a pilot or operator 46 and seating 48. The monitors 42 are adjacent or abutted to each other so as to preferably provide as close to a seamless composite display of the various images captured by the cameras 20. The monitors in other embodiments may be placed in different positions other than as described here.

In this embodiment each monitor has an associated receiver 50, and each receiver has a dedicated antenna 52. Each antenna 52 of the receivers 50 communicates with one corresponding antenna 26 of the cameras 20, in a manner that will allow the monitors 42 to display the captured images of the cameras 20 in the same order as they are captured by the cameras 20. In this way, a generally 360-degree surround image is assembled and produced on the monitors to display the view much like an operator would have if he or she were actually in the aerial vehicle 16. The cameras in the camera array may employ panoramic lenses and/or sensors to create a wrap-around surround view.

It is to be noted that the drawings only show the image capture and monitoring system, but there will also be ground or remote controls to navigate the aerial vehicle (when unmanned) so that it can be directed and flown to the desired location and orientation. Further, each of the lenses 22 on the cameras 20 may be adjustable, either manually or automatically, so that they are directed on the vertical axis upward or downward, or on the horizontal axis left or right, to the area to be viewed. Such adjustments may become necessary as the vehicle 16 ascends or descends, or maneuvers in any direction on a horizontal plane so that the desired or selected area below or around the aircraft continues to be the main focus for the cameras 20.

Figure 2:
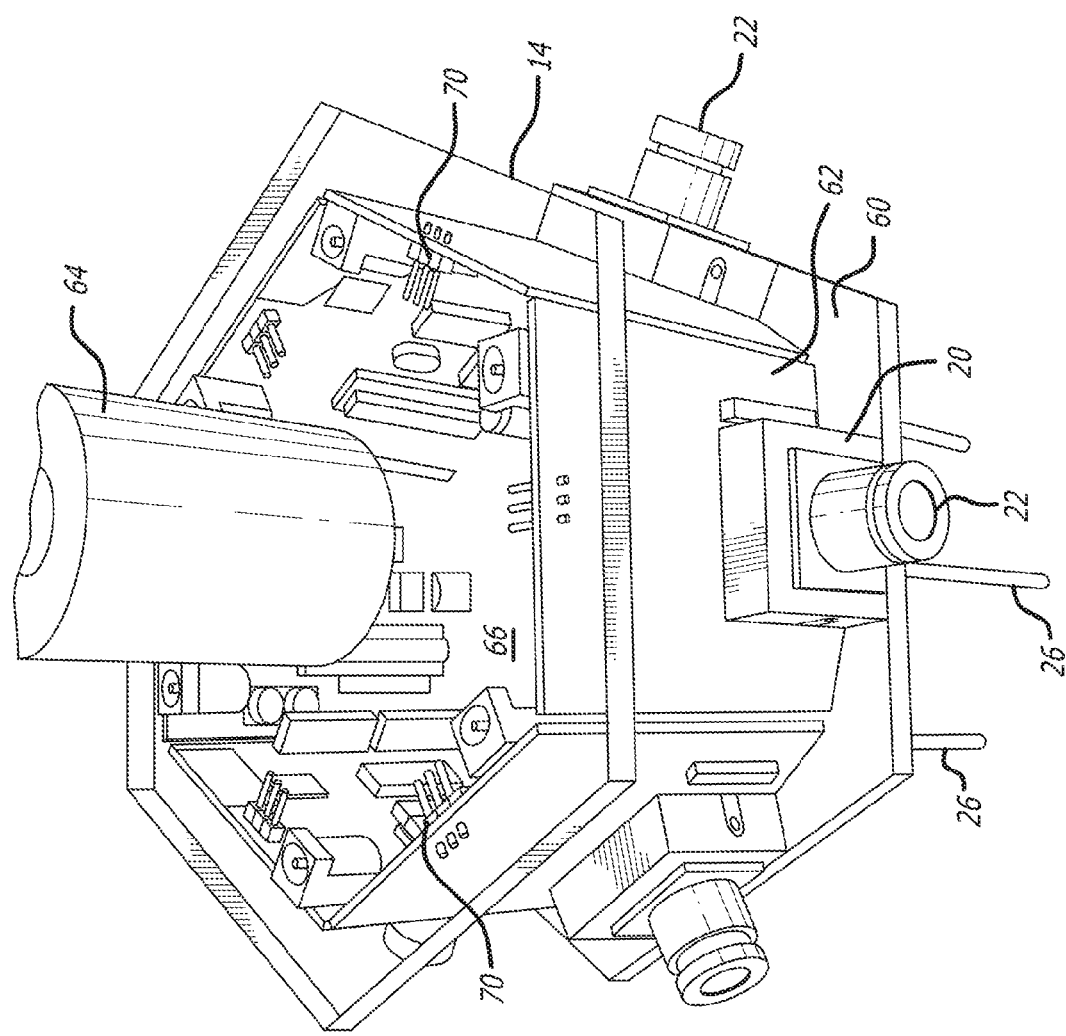
FIG. 2 is a perspective view of an embodiment of a camera or sensor arrangement on an unmanned aerial vehicle.

Reference is now made to FIG. 2 that shows a detailed embodiment of the camera array 12 mounted on the aerial vehicle 16 in the present embodiment. The frame 14 is shown as generally comprised of six equal panels 62 arranged in the shape of a hexagon and having an outside lower shelf 60 which supports each camera 20 and lens 22 facing outwardly, each lens 22 being positioned to capture its own approximately 60-degree segment of the surroundings. The frame 14 is fixed to the aerial vehicle 16 by means of an appropriate attachment fitting 64. The frame 14 defines an internal chamber or space 66 designed to house the electronics and other hardware for operating the system, including a transmitter 70 associated with each camera 20 which is connected to its respective antenna 26 located below the shelf 60 to facilitate optimal and unimpeded communication with the antennae 52 on the monitoring station 40. The circular (or semi-circular) camera array can be fashioned on a horizontal or vertical plane, or any combination of both horizontal and vertical planes, in segments or contiguously.

Figure 3:
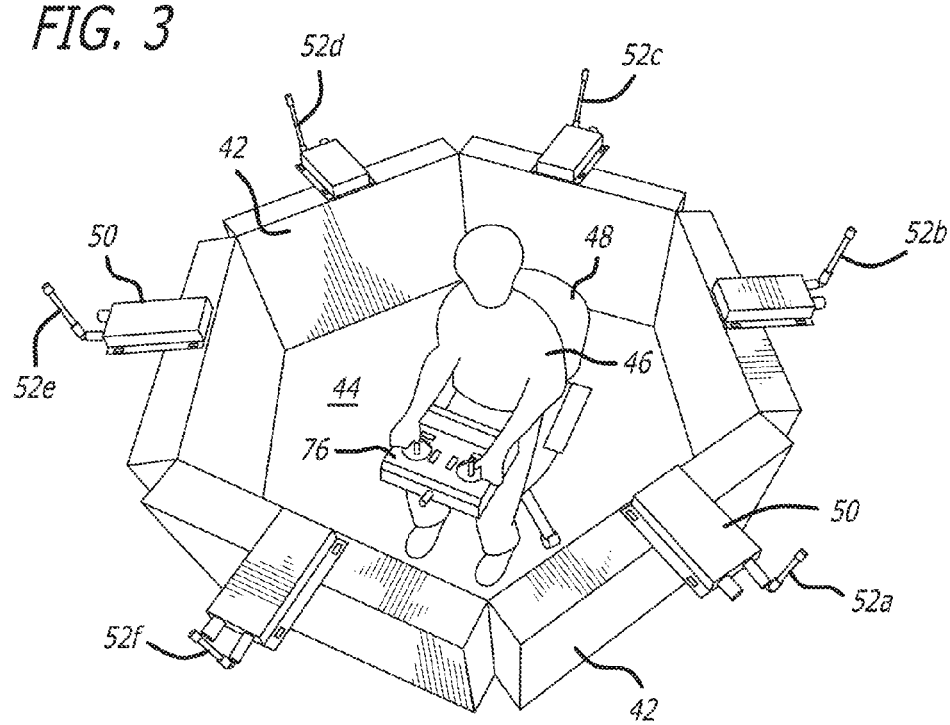
FIG. 3 is a top perspective view of an embodiment of a monitoring and display station.

FIG. 3 shows a detailed view of an embodiment of a monitoring station 40 depicting an operator 46 with control box 76 on a seat 48 placed in the space 44. The operator 46 is surrounded by the hexagonally arranged bank of six monitors 42, each monitor 42 having its dedicated receiver 50 with antenna 52. The seat 48 is on wheels or casters, offering the operator 46 mobility in moving about the space 44, with the ability to turn or rotate his position to view any one or more of the six monitors 42. The six monitors collectively provide a 360-degree panoramic view that would be available to a person sitting in the aerial vehicle 16. In other embodiments the number and placement of monitors can be different from the present embodiments. The circular (or semi-circular) monitor array can be fashioned on a horizontal or vertical plane, or any combination of both horizontal and vertical planes, in segments or contiguously. In other embodiments monitors can share receivers and/or antennas as well. In other embodiments the seat 48 can also be configured differently.

Figure 5:
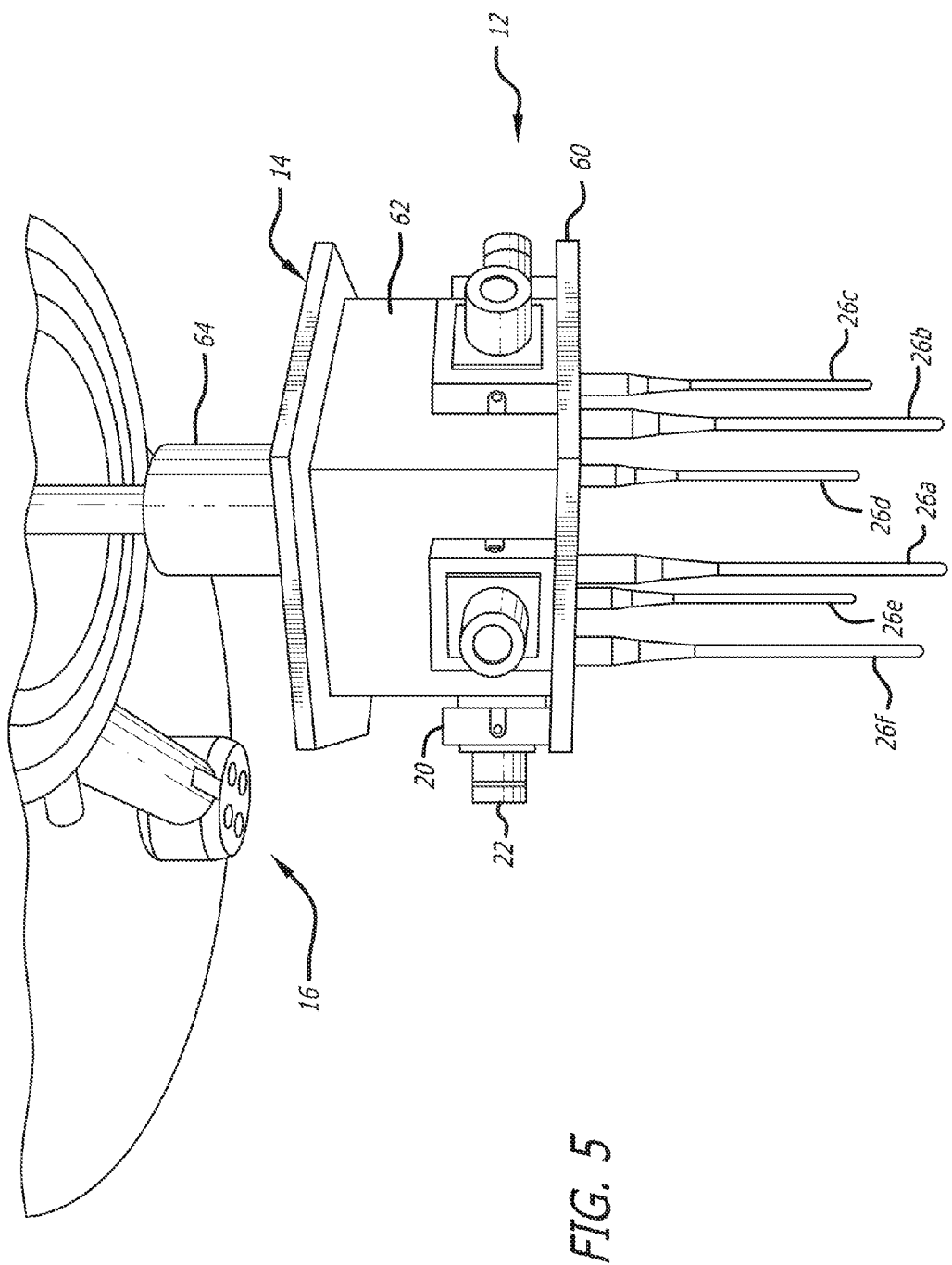
FIG. 5 is a detailed perspective view of and embodiment of a image capture apparatus and antenna shown mounted on an aerial vehicle which is partially shown.

Each of the six antennae shown in the embodiment in FIG. 3 has been designated its own reference numeral, 52a, 52b, 52c, 52d, 52e and 52f. Each of these antennae 52a to 52f has its frequency communication setting and is programmed to receive data from one of the six corresponding antennae 26 on the camera array 12. FIG. 5 depicts a more detailed view of an embodiment of the antennae 26 associated with the cameras or sensors 20, there are six antennae each having their own reference numerals, namely, 26a, 26b, 26c, 26d, 26e and 26f. Thus antenna 26a communicates with antenna 52a, antenna 26b communicates with antenna 52b, and so on. Each camera 20 therefore has the image it is capturing displayed on a dedicated monitor 42, all of the monitors 42 together providing the composite real time image of the surroundings as would be observed from the aerial vehicle 16. The vehicle operator also has the ability to move the aerial vehicle 16 in both direction and orientation to a selected location or position so that the image of the desired areas can be secured at the monitoring station 40.

Figure 4:
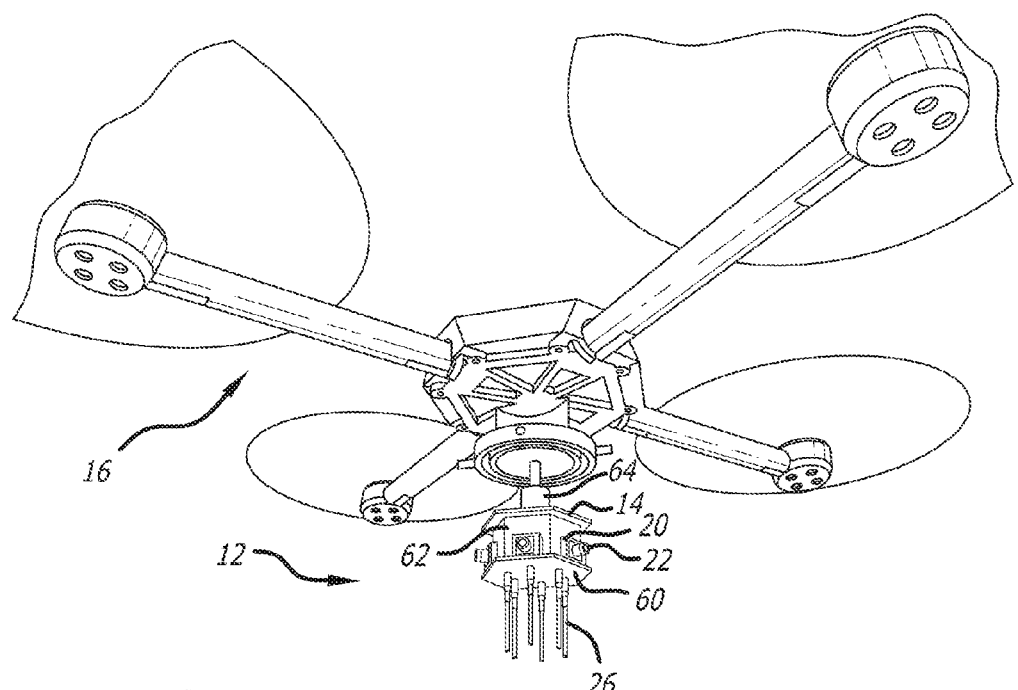
FIG. 4 is a detailed perspective view an embodiment of an image capture apparatus mounted on an airborne vehicle.

FIG. 4 depicts an upward perspective view of an embodiment of the aerial vehicle 16, the attachment fitting 64, frame 14 and cameras 20. This figure illustrates a situation where the system may be capturing images and transmitting them as described above.

Figure 6:
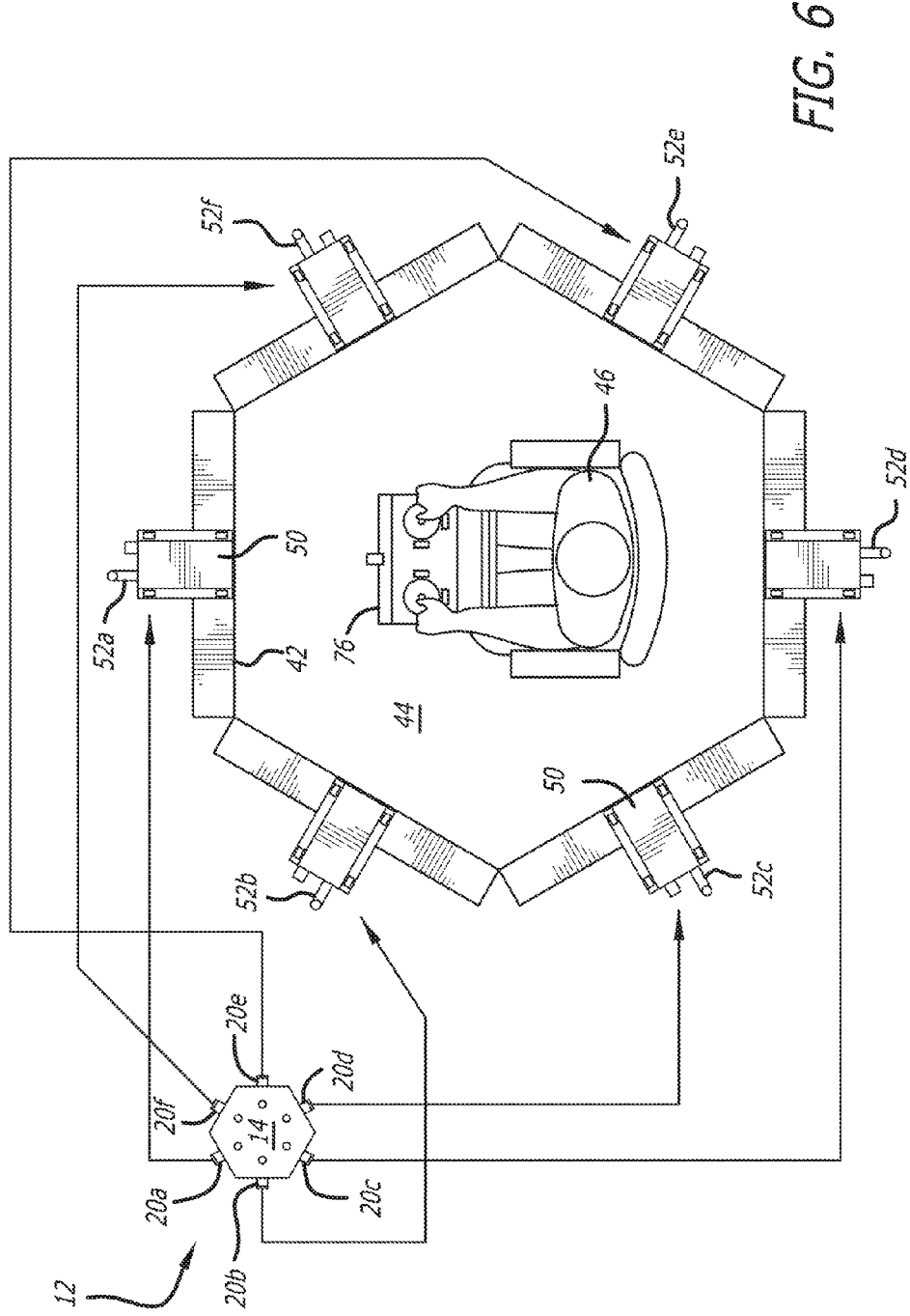
FIG. 6 is a top schematic view of an embodiment of a monitoring station and the image capture apparatus showing the respective transmitters and receivers associated with each other.

FIG. 6 shows a schematic representation of an embodiment of the camera array 12, including cameras 20a, 20b, 20c, 20d, 20e and 20f, while attached to the aerial vehicle 16 (not shown) and its manner of communication with the monitoring station 40 as has already been described above. This figure illustrates the specific mechanism of communication between the two, with a transmitter 70 and antennae 26a, 26b, 26c, 26d, 26e and 26f on the aerial vehicle 16 communicating exclusively with its corresponding antenna 52 and receiver 50 on the monitoring station 40. As mentioned above, there are embodiments of the invention where two or more signals from separate transmitters 70 are combined or matrixed, transmitted through a common antenna, and then decoded at the monitoring station 40 and directed to the appropriate monitor 42 to reconstruct the composite image. In other words, it is not necessary to the invention that each camera 20 and monitor 42 has its own transmitter or receiver, so there may be fewer such transmitters or receivers than there are cameras 20.

While FIGS. 1 to 6 show embodiments with six cameras or monitors, other embodiments may have any numbers of these components. For example, in one embodiment there may be only four of each, or eight of each. Additionally, the cameras may not necessarily capture the entire 360-degree panoramic view. There may be two or more cameras for capturing images which represent only part of the full circumference, and the individual views need not be contiguous each other. There are many variations possible all of which are embodiments captured by this invention.

Figure 7:
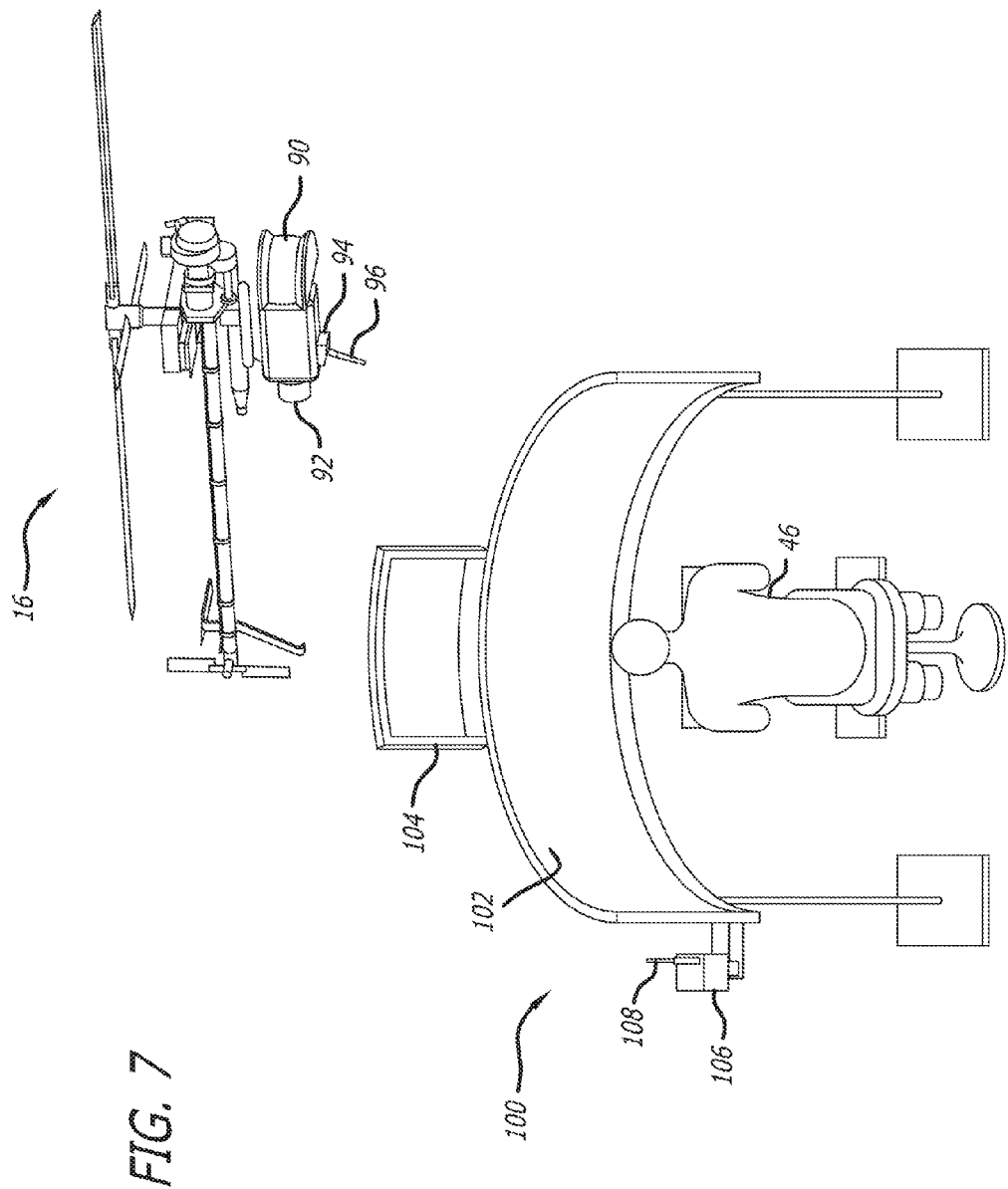
FIG. 7 is a schematic view of an embodiment of an aerial vehicle with cameras or sensors and a monitoring station with displays.

FIG. 7 shows another embodiment of the invention. The aerial vehicle 16 in this embodiment has two cameras, namely, a forward facing camera 90 which captures a 180-degree field of view, and rearward-facing camera 92 having a 90-degree field of view. The cameras 90 and 92 therefore combine to provide a cumulative field of view of approximately 270 degrees. Each camera (or sensor, as the case may be) 90 and 92 may have its own transmitter and associated antenna, or there may be a single transmitter 94, as illustrated in FIG. 7, with its antenna 96 which transmits the combined signal from both cameras 90 and 92 to a receiver for display as will be described. Note that the two cameras 90 and 92 may provide a field of view with different cumulative combinations to that illustrated in other embodiments, or even the full 360-degree view, based on the specific requirements and parameters of a given operation. Further, in this and other embodiments any rearward-facing camera may optionally be displayed as a reverse image to emulate the rearview image in an automobile.

The monitoring station 100 can be modified to suit the configuration of the cameras 90 and 92. The monitoring station 100 comprises a larger curved display 102 showing a 180 degree view corresponding to the image captured by the forward facing camera 90. The operator or pilot (or someone serving both of these functions) 46 sits in front of this display 102 as shown. A smaller curved display 104 is placed above the larger curved display 102, so that both the front view image from the aerial vehicle as well as the back view image can be observed simultaneously without having to physically shift positions within the space 44 referenced above. Precedence in terms of image size will be given to the forward view transmitted, but at the same time, the operator 46 will have within her peripheral vision at least the view to the rear of the aerial vehicle, as captured by the rearward facing camera 92.

The monitoring station 100 includes a receiver 106 with antenna 108 for communicating with and receiving data streams or signals from the transmitter 94. The number of receivers 106 on the monitor station 100 will correspond with the number of transmitters on the aerial vehicle 16 to facilitate proper presentation of the video stream accurately at the monitor station 100. Instead of multiple streams, there may be a combined matrix or single stream, as described with reference to a previous embodiment.

Note that in different embodiments a combination of flat panel viewing and curved panel viewing may be provided. Thus, for example, a larger curved display 102 may be used in conjunction with one or more smaller flat panel displays of the type illustrated above, to present a view suitable to the circumstances of the operation.

Figure 8:
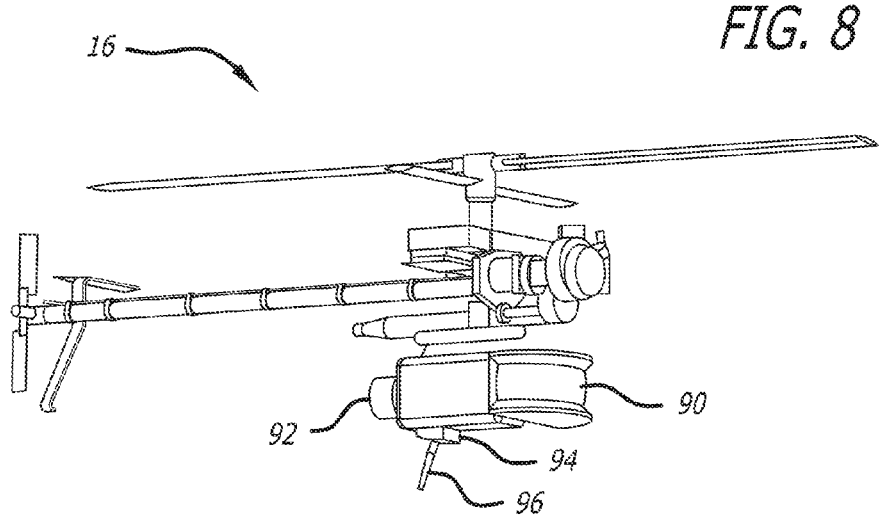
FIG. 8 is a detailed view of an embodiment of an aerial vehicle and its cameras or sensors of the type illustrated in FIG. 7.
Figure 9:
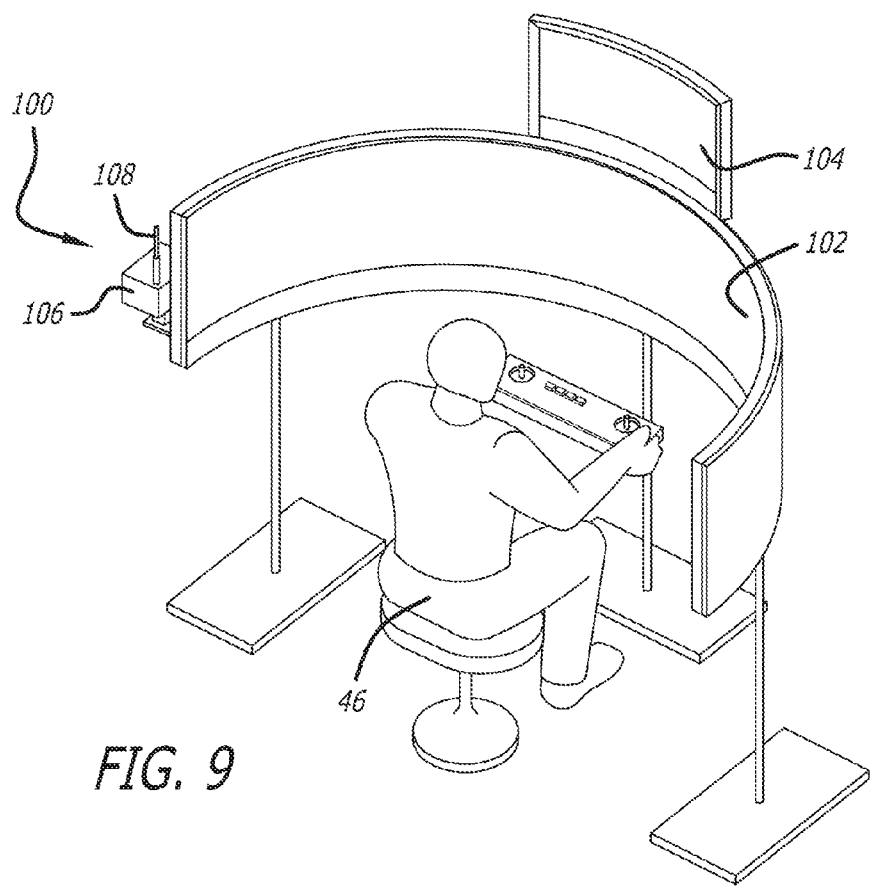
FIG. 9 is a detailed view of an embodiment of a monitoring station and its monitors or displays of the type illustrated in FIG. 7.

FIG. 8 shows a more detailed view of an embodiment the aerial vehicle 16 as illustrated in FIG. 7, while FIG. 9 shows a more detailed perspective view of an embodiment of the monitor station 100, with a better view of the control panel used by the operator to manage and adjust the cameras as well as the direction of flight and orientation of the aerial vehicle.

Figure 10:
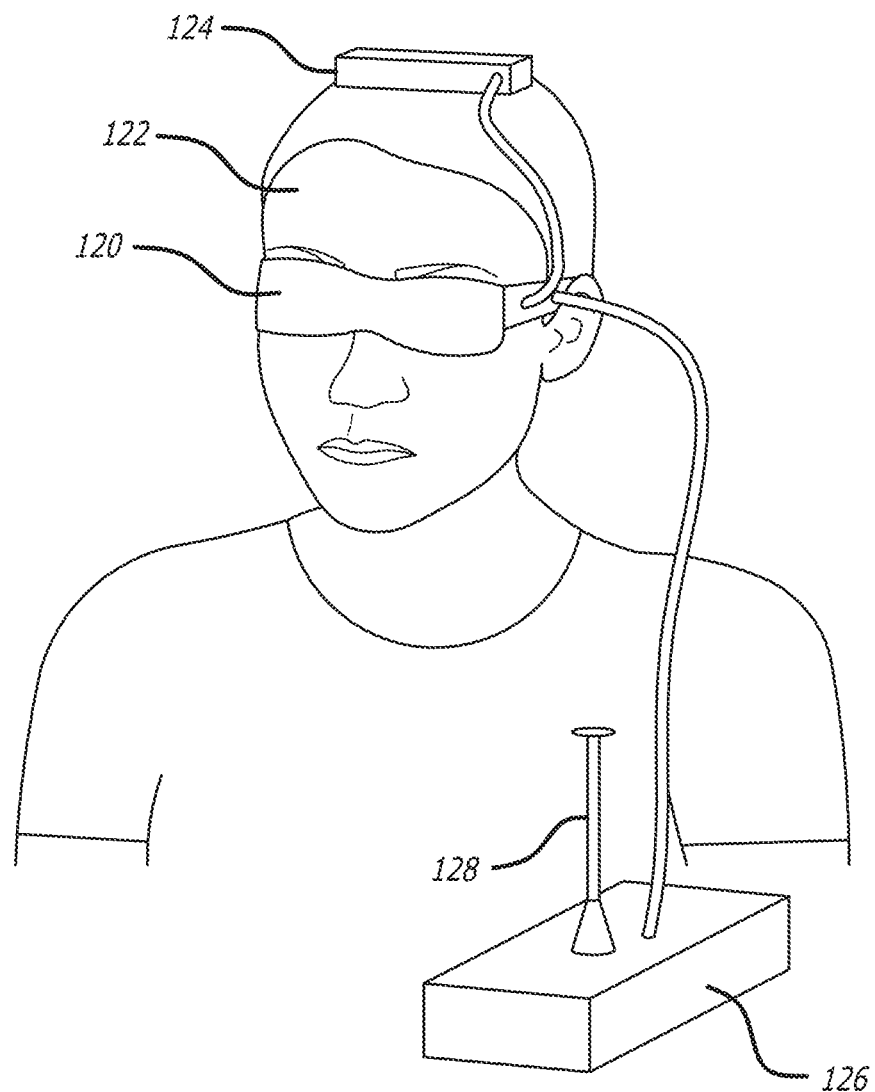
FIG. 10 shows a schematic view of an embodiment of goggles and related hardware worn by an operator for viewing the image captured on the aerial vehicle.

FIG. 10 is a schematic representation of an embodiment of video goggles 120 that may be worn by a user or operator 122 for viewing the signals transmitted from the cameras or sensors. In a preferred form of the invention, the goggles 120 may have sensors 124 for determining the position of the head of the operator 122 and displaying the image (such as a forward facing, rearward facing or side facing image) according to the sensed position of the head. There may also be associated with the goggles 120 a receiver 126 with antenna 128 which will have a purpose and function as already described.

Figure 11:
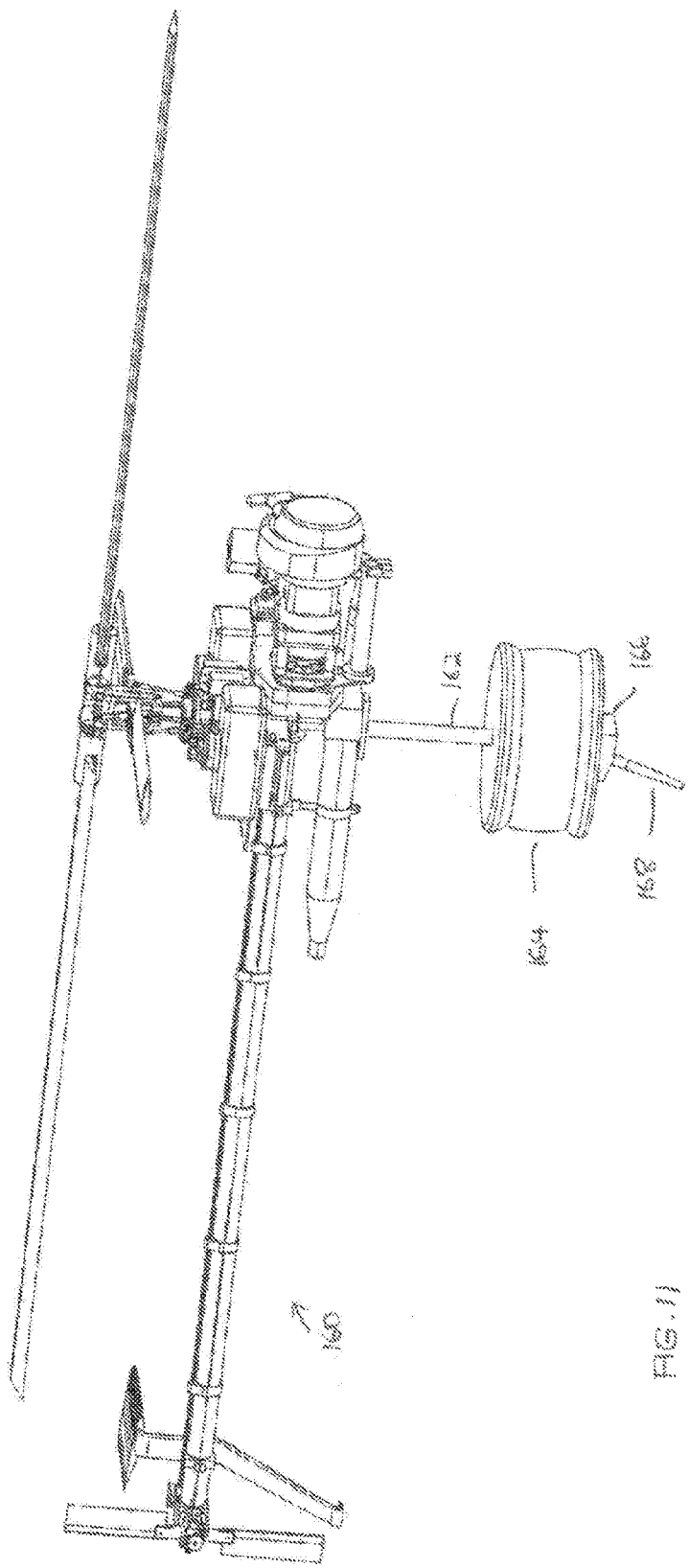
FIG. 11 is a schematic representation of an embodiment of an unmanned aerial vehicle including a circular sensor in accordance with a further aspect of the invention.

Reference is now made to FIG. 11 that shows an embodiment of an unmanned aerial vehicle 160. Note that this figure shows an unmanned aerial vehicle 160, but it is within the scope of the invention that the vehicle may also be manned or operated by an onboard pilot. The vehicle 160 may itself be similar to that which has been previously described, such as illustrated in FIG. 8. The vehicle 160 has a sensor attachment fitting 162 extending downward, and a circular sensor 164 fixed to the sensor attachment fitting 162. There is further provided a video transmitter 166, and a video antenna 168. It is to be noted that this figure illustrates a sensor that has 360-degree circular or near such circular viewing capabilities. The image captured is therefore of the 360-degree view surrounding the circular sensor 64. In other embodiments, the circular sensor may not necessarily capture images of the total 360-degree view, but may be less than this, such as, for example only, 270 degrees.

Figure 12:
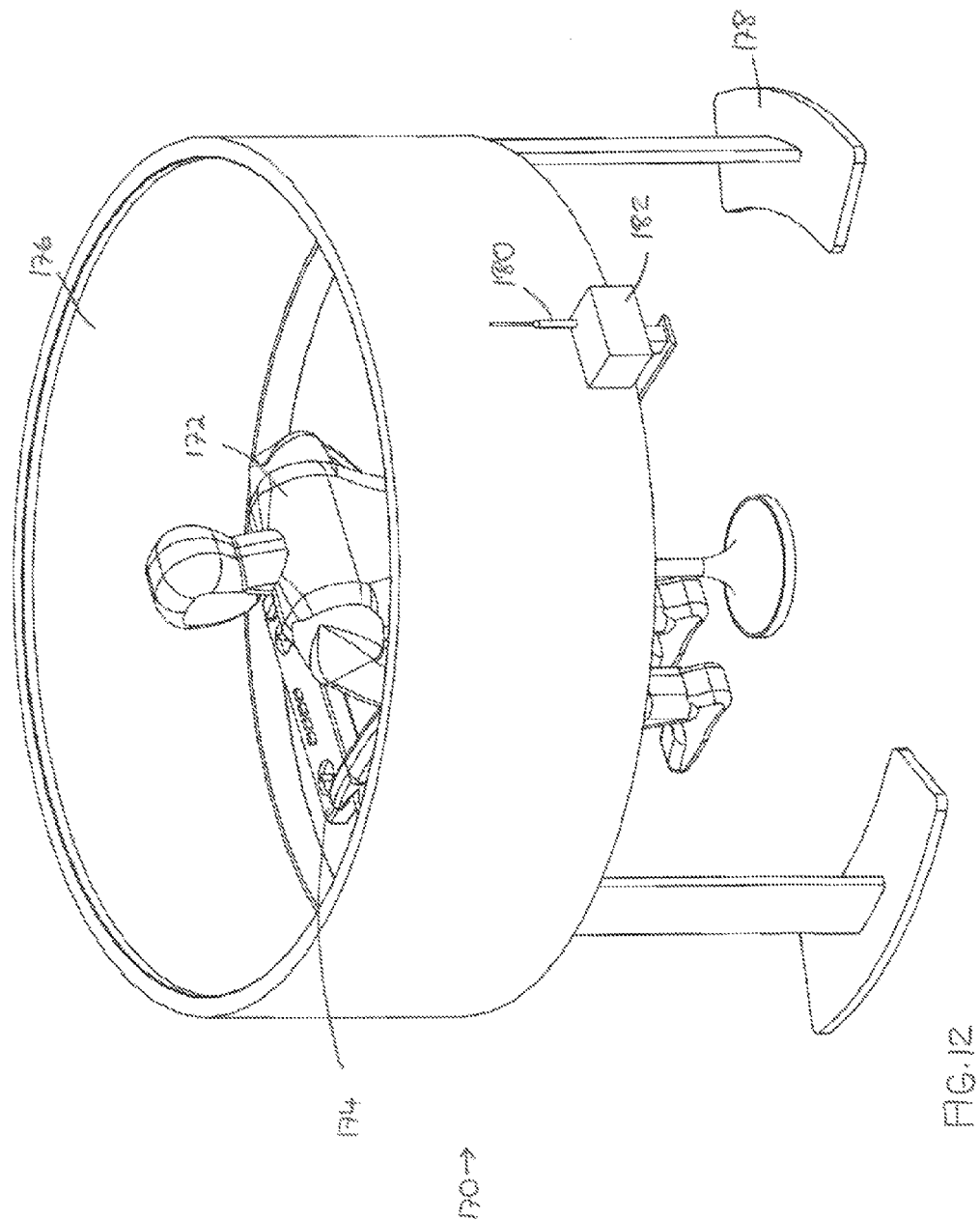
FIG. 12 is a schematic representation of an embodiment of a monitoring station including a circular video display.

FIG. 12 shows an embodiment of a monitoring station 170 that comprises a central area for accommodating the pilot 172 and the unmanned aerial vehicle-piloting controller 174. A circular video display 176, mounted on legs or a frame 178, is positioned about the pilot 172. The video display 176 receives data through a video receiver antenna 180, and a video receiver 182, so that the image is displayed on the circular substantially continuous video display 176. It should be noted that the circular video display 176 would typically be one that receives data from an unmanned aerial vehicle having a circular sensor 164 as generally illustrated in FIG. 11.

Figure 13:
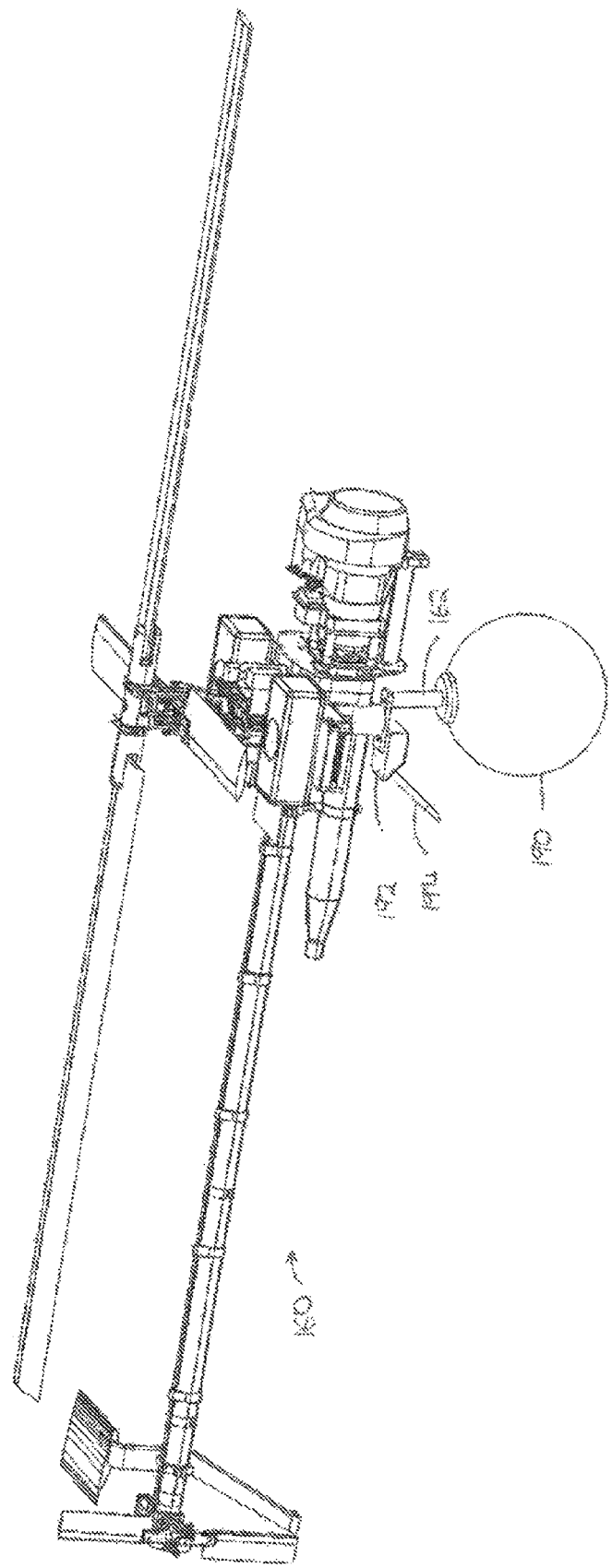
FIG. 13 is a schematic representation of an embodiment of an unmanned aerial vehicle including a spherical sensor.

FIG. 13 shows an embodiment of an unmanned aerial vehicle 160 that has a sensor attachment fitting 162. A spherical sensor 190 is fixed to the sensor attachment fitting 162, and is able to capture images that are spherical in nature. Such spherical images would include substantially 360-degree views in both the vertical and horizontal orientations. The images so captured by the spherical sensor 190 are transmitted to a video transmitter 192 with accompanying video antenna 194 which are in turn transmitted to a monitoring station.

Figure 14:
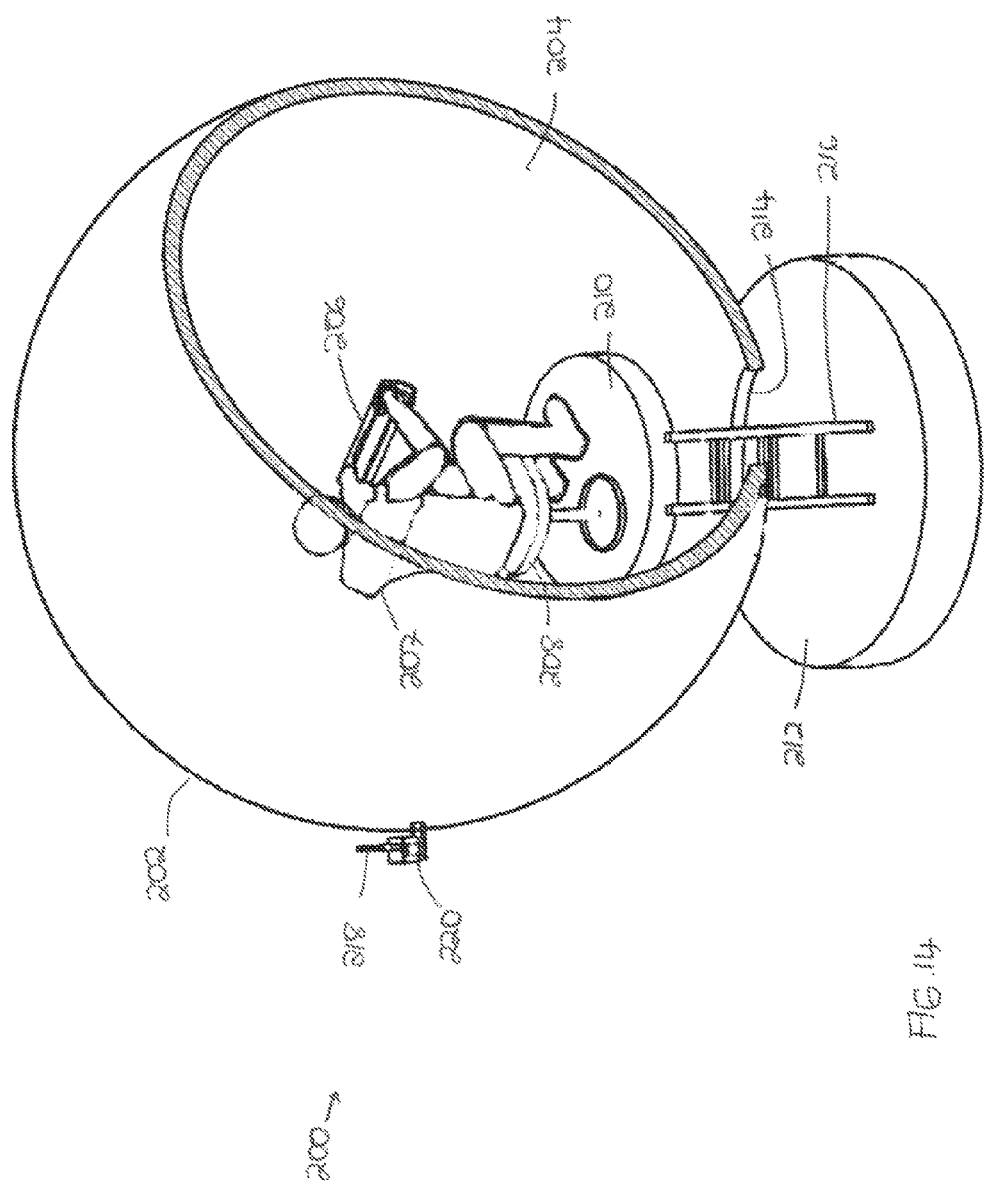
FIG. 14 is a schematic representation of an embodiment of a monitoring station including a substantially spherical video display.

FIG. 14 shows an embodiment of a monitoring station 200, partially cutaway to illustrate its interior features, having a structure and configuration which is adapted to display images which have been captured by the spherical sensor 190 illustrated in FIG. 13 and transmitted to the monitoring station 200 through the video transmitter 192 and video antenna 194. The monitoring station 200 comprises a video display enclosure 202 of generally spherical shape with a video display screen 204 on the inside surface thereof. Inside the video display enclosure 202, a piloting controller 206 may be accommodated, and a pilot 207 sits on a seat 208 mounted on a seat base 210. The video display enclosure 202 is itself mounted on a supporting base 212, and has an enclosure access port 214 and ladder 216 for the convenience of the pilot controller 207. Associated with the video display enclosure 202 is a video receiver antenna 218 and video receiver 220. Data captured from the video antenna 194 by the receiver antenna 218 is processed through the video receiver 220 and displayed on the video display screen 204.

Figure 15:
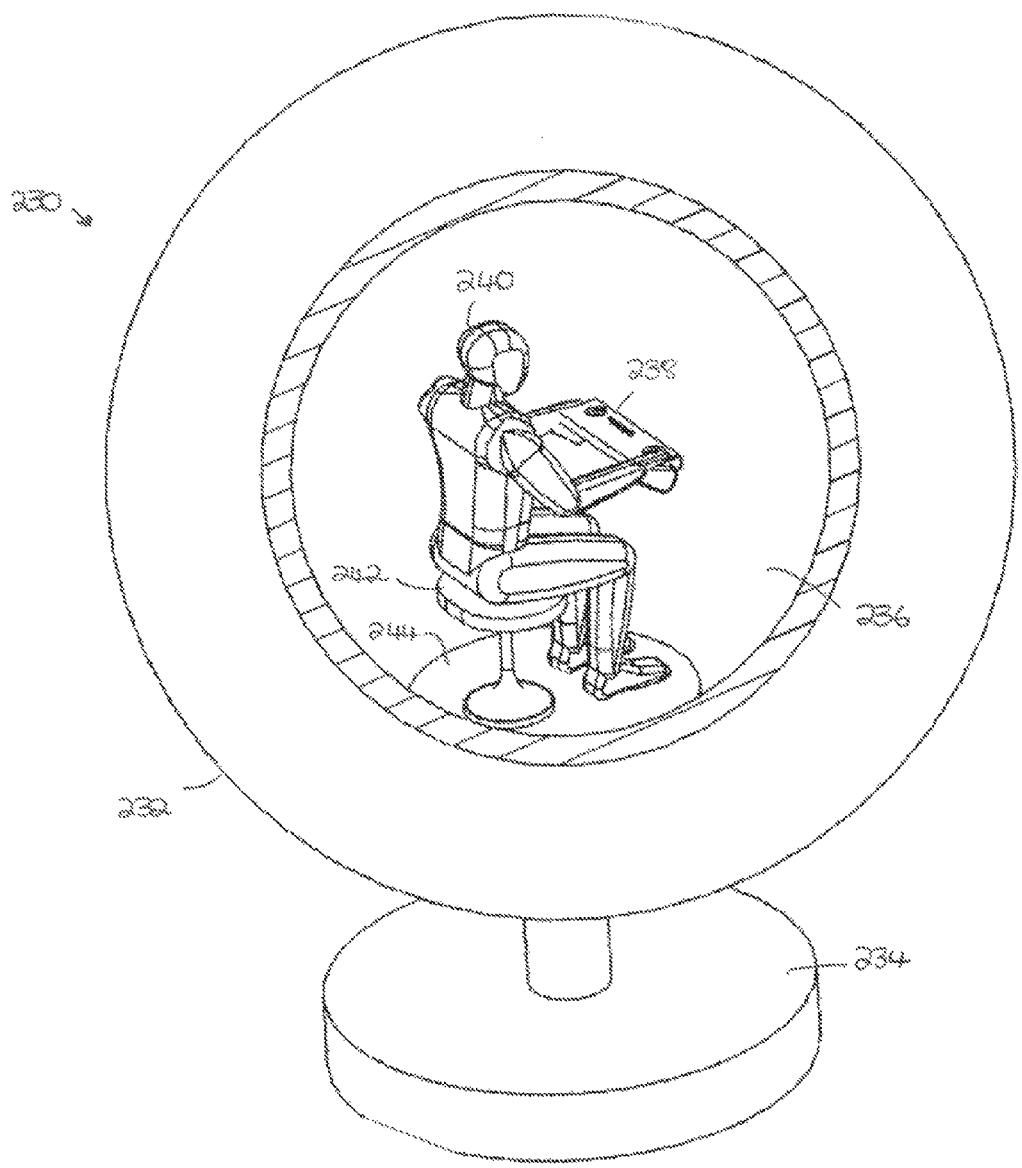
FIG. 15 is a schematic representation of an embodiment of a monitoring station, including a spherical video display.

FIG. 15 shows a further view of an embodiment of a monitoring station 230 in accordance with the present invention. The monitoring station 230, cutaway for demonstrating the interior, shows the video display enclosure 232 mounted on a base 234, and a video display screen 236 of the inside surface of the video display enclosure 232. The piloting controller 238 is positioned for convenient use by a pilot 240, who sits on a seat 242 supported on a platform 244.

Figure 16:
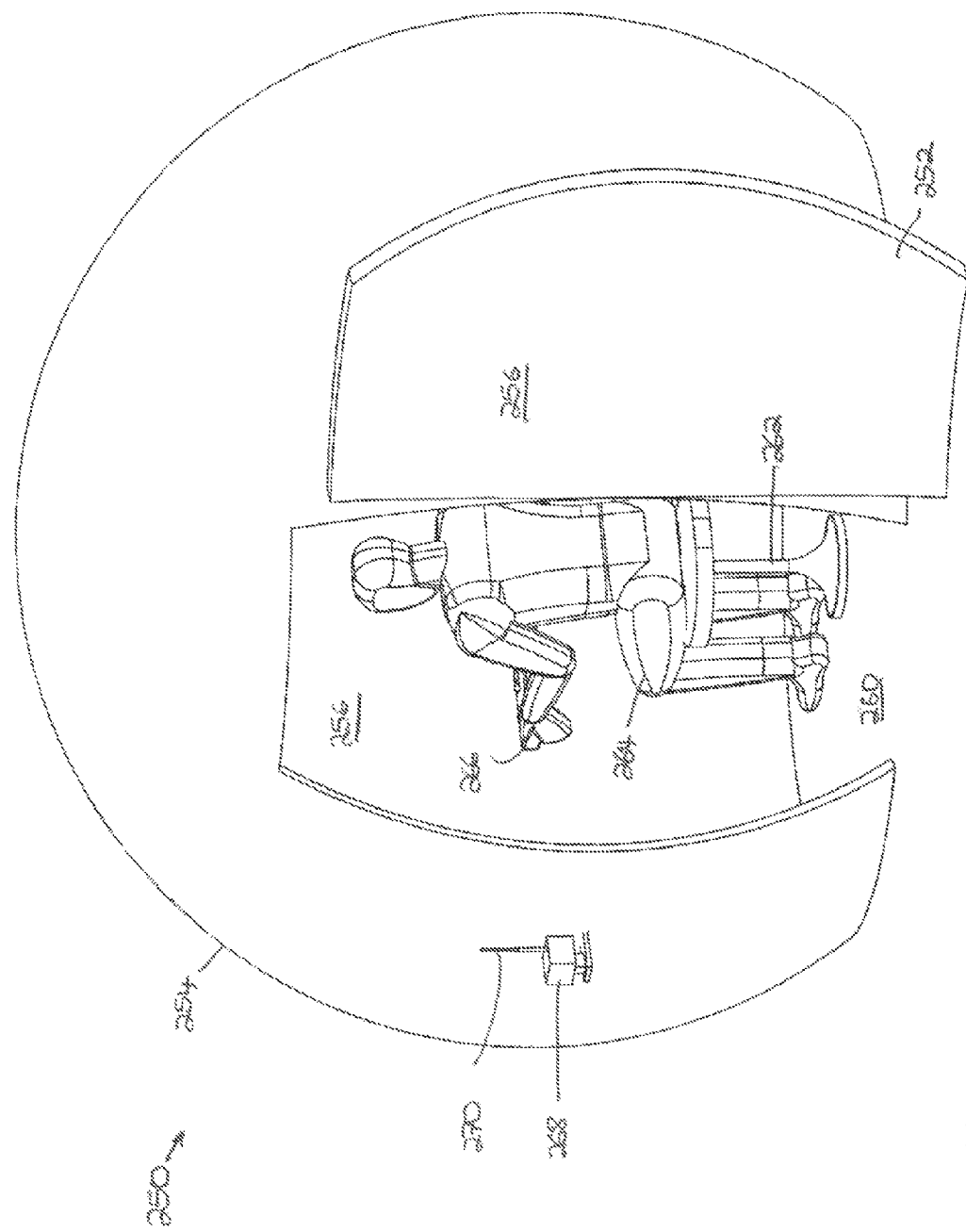
FIG. 16 is a schematic representation of an embodiment of a monitoring station.

FIG. 16 shows an embodiment of a monitoring station 250 that is generally substantially spherical, but is cutaway at its lower edge or portion. The monitoring station 250 is accessed through an enclosure access door 252 that forms an integral part of the substantially spherical video display enclosure 254. The video display screen 256 is preferably formed on the inside surface of the video display enclosure 254, including over the inside surface of the access door 252, so that when the door 252 is closed, a preferably continuous and substantially seamless image will be shown on the video display screen 256 including over the inside of the access door 252. Within the video display enclosure 254, a floor platform 260 is formed, upon which a seat 262 is mounted, the seat 262 being for the benefit of the pilot 264. The pilot 264 operates a controller 266, as previously described and illustrated. The video display enclosure 254 has a video downlink receiver 268 with an associated video downlink receiver antenna to 270. The antenna or 270 and receiver 268 receive captured images from an unmanned aerial vehicle, and through appropriate controllers convert these images to live feed on the video display screen 256.

Figure 17:
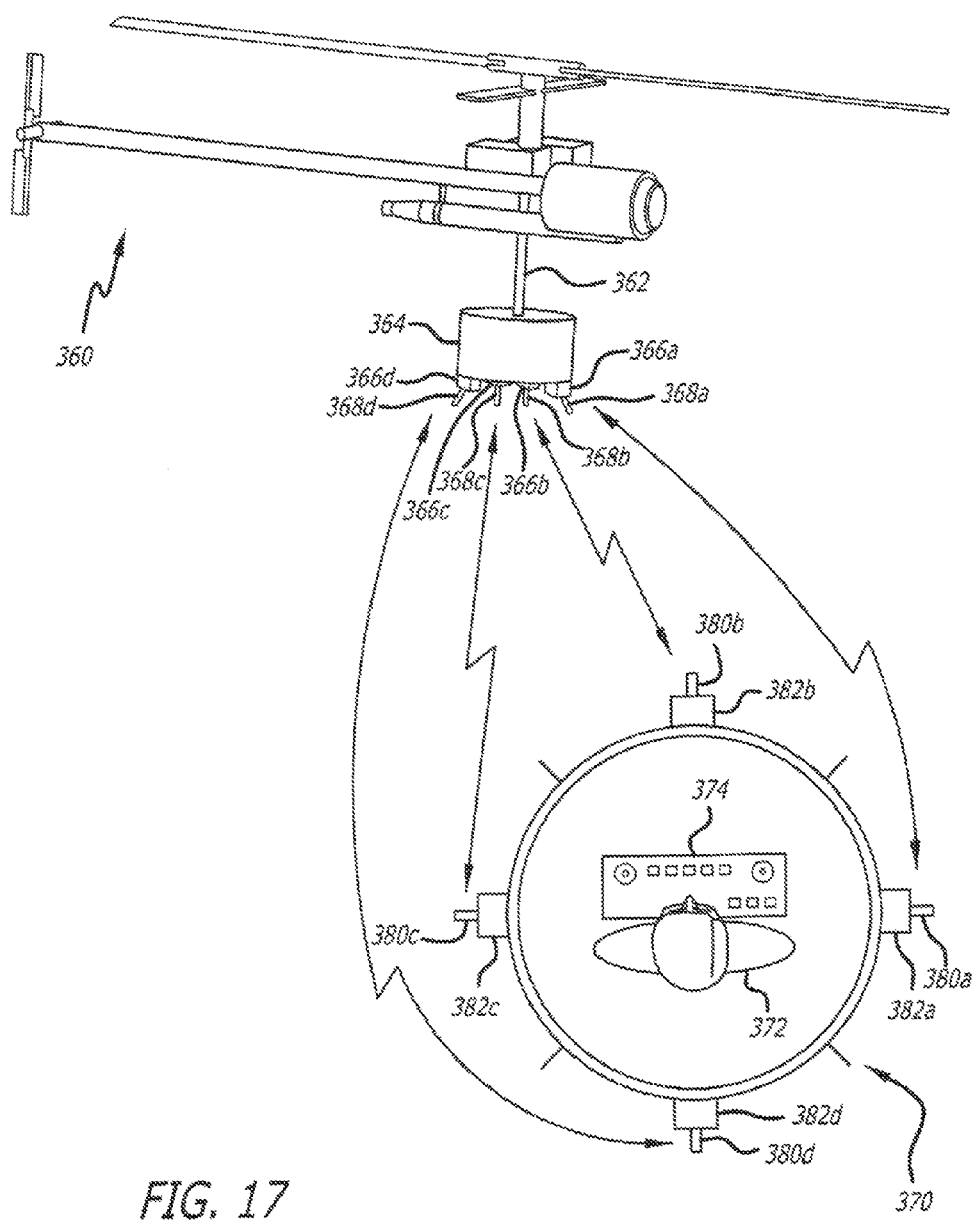
FIG. 17 is a schematic representation of an embodiment of an unmanned vehicle and monitoring station utilizing circular or spherical image capture and display with a plurality of sensor and display mechanisms, transmitters and receivers.

FIG. 17 shows an embodiment that may have a spherical or circular image capturing mechanism, and a spherical or circular monitor. In this embodiment, there is a plurality of image sensors, transmitters, receivers, as well as monitor sections. In this figure, there is shown an unmanned aerial vehicle 360 having an attachment mechanism 362 depending therefrom, upon which a sensor housing 364 is mounted. The sensor housing 364 contains a plurality of sensors able to capture an image that is circular or spherical in nature. The sensor housing 364 has four transmitters 366a to 366d, each of the transmitters having an associated antenna 368a to 368d. These transmit the images captured within the sensor housing 364 to a monitoring station 370. The monitoring station 370 is configured to accommodate an operator 372 and control board 374. The monitoring station 370, in the present embodiment, has four sections, each of the four sections having a receiver 382a to 382d, each of these receivers having an associated antenna 380a to 380d. The transmitters 366 and antennae 368 transmit respective images to antennae 380 and receivers 382. Where there are four image-capturing sensors in the sensor housing 364, four sections of the monitoring station 370 display an image corresponding to each of these four capturing sensors. Preferably, the four images are seamed together so as to provide a substantially continuous image around the operator 372 that according to the nature of the monitoring system may be circular, spherical, or a combination thereof. Although four image sensors are shown in FIG. 17, the invention is not limited to spherical or circular monitoring with for such sensors, and there may be any number of conveniently selected sensors and corresponding monitors. Furthermore, the number of sensors and monitors need not be the same, with a particular transmitter transmitting its image to more than one monitor section, or vice versa.

Figure 18:
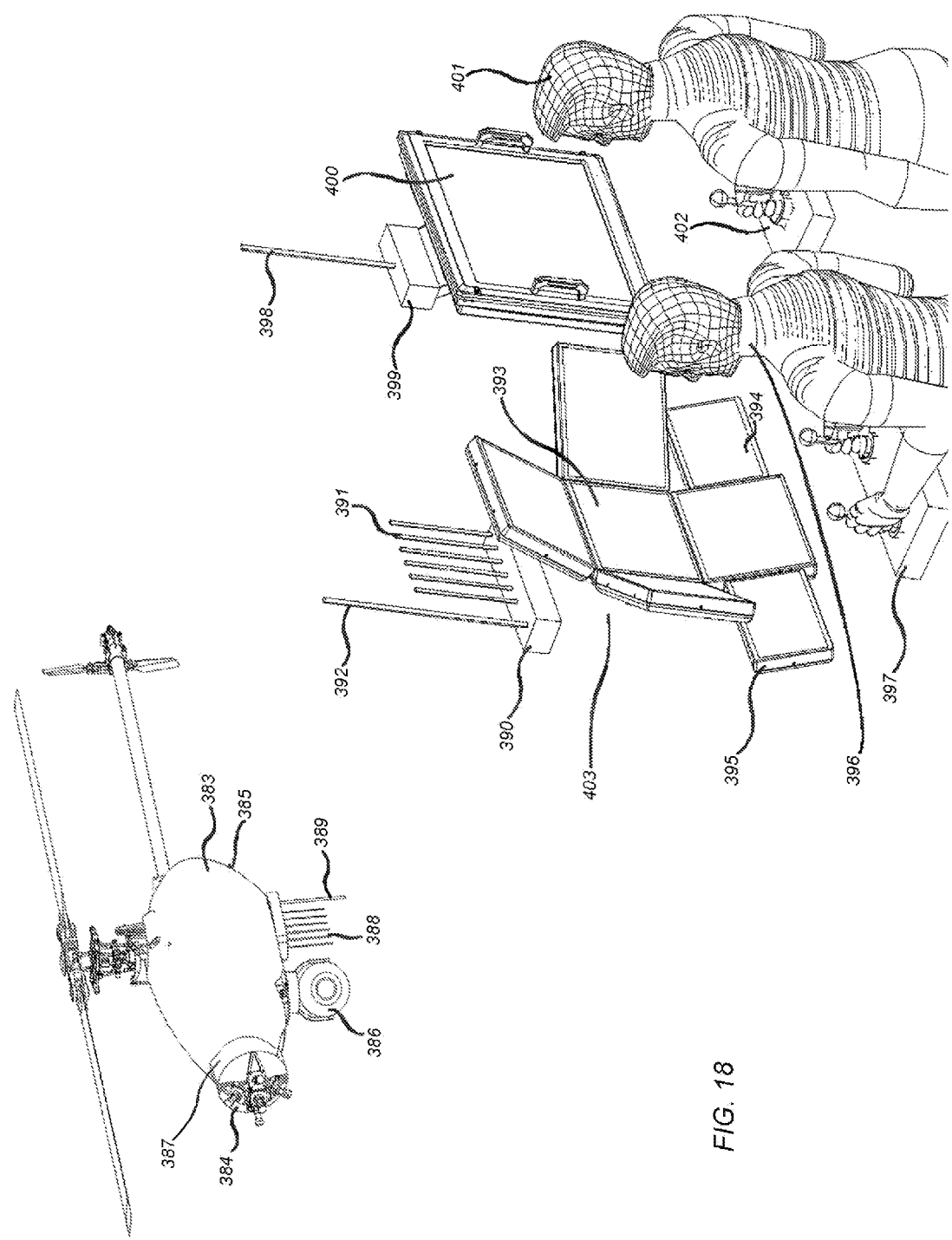
FIG. 18 is a perspective view of an embodiment of a first and second system camera or sensor arrangement with a corresponding monitoring ground station arrangement utilized by an unmanned aerial vehicle in accordance with one embodiment of the invention, where a pilot and an operator assisting the pilot are controlling the system.

FIG. 18 shows another embodiment of the aerial vehicle 383 with a two-tiered, first and second camera or sensor system arrangement. The first system is configured as a forward facing multi-camera array 384 that captures a 180-degree horizontal frontal field-of-view and 150-degree vertical frontal field-of-view, and rearward-facing camera (hidden in the drawing) 385 having a 90-degree field of view. The second system is configured as a single, gimbaled, articulating camera or sensor arrangement 386 that can rotate 360 degrees on any axis, and is controlled by the articulating camera operator 401 assisting the pilot 396. Other suitable camera movement or articulation mechanisms or methodologies may be used instead of a gimbal mount. The output of the sensors from the first and second systems is fed to a series of corresponding transmitters 387. The signals of the first system are transmitted via an array of antennas corresponding to the first system's multiple signal feeds 388 and the second system's single signal feed 389. The first monitoring station 403 is configured to mirror the airborne arrangement of the first camera system front camera array 384 and rear single camera 385, and second system articulating camera 386.

Downlinked transmissions from the aircraft are received by the first system's antenna array 391 and the second system's single antenna 392, and fed to the station's video downlink receivers 390. The feeds from the first system array 384 are displayed on the associated monitors surrounding the center monitor screen 393. The rear camera 385 feed is displayed on the rearview monitor 394. The articulating camera feed 386 is displayed on its associated monitor 395. The pilot 396 interprets the displayed visual information and maneuvers the aircraft accordingly by means of a remote controller 397. The second monitoring station's antenna 398 captures the downlinked video transmission from the second system articulating camera 386, transmitter 387, antenna 389 feed and sends it to the second monitoring station antenna 398 and receiver 399. The video downlink signal is then sent to the second monitoring station monitoring display 400. The operator assisting the pilot 401 views the displayed information, positioning the airborne articulating camera 386 via his or her remote controller 402, with the intention of providing visual data for the pilot 396 and to collect visual information or other mission data.

Figure 19:
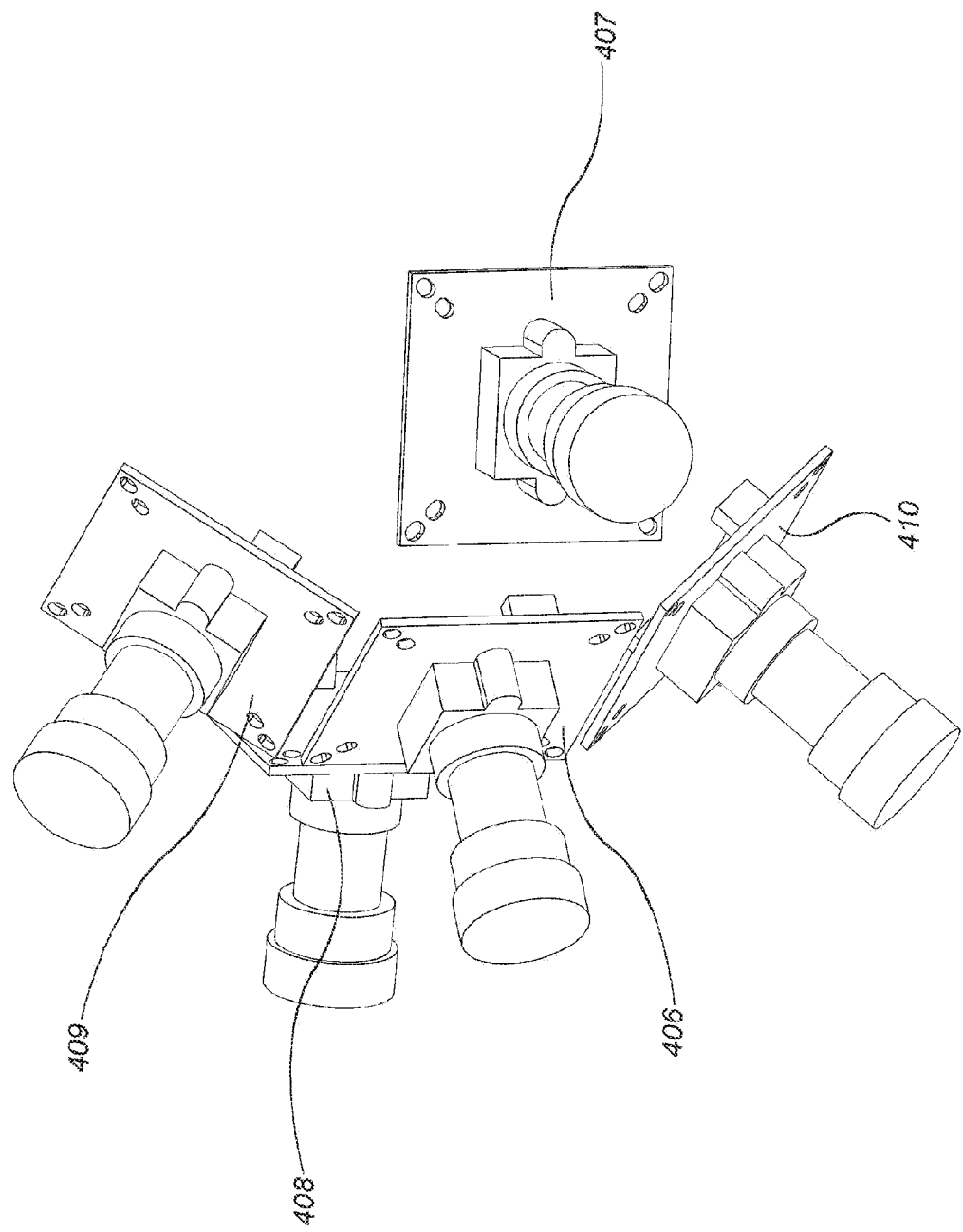
FIG. 19 is a detailed view of an embodiment of the first system camera or sensor arrangement of the type illustrated in FIG. 18.

FIG. 19 shows a detailed view of an embodiment of a lens orientation of the first system multiple-camera array as depicted in FIG. 18. In this particular embodiment, the array consists of a center camera 406, a left camera 407, a right camera 408, an upward-facing camera 409, and a downward-facing camera 410. This geometrical camera arrangement allows for a contiguous 180-degree horizontal frontal field-of-view and 150-degree vertical frontal field-of-view.

Figure 20:
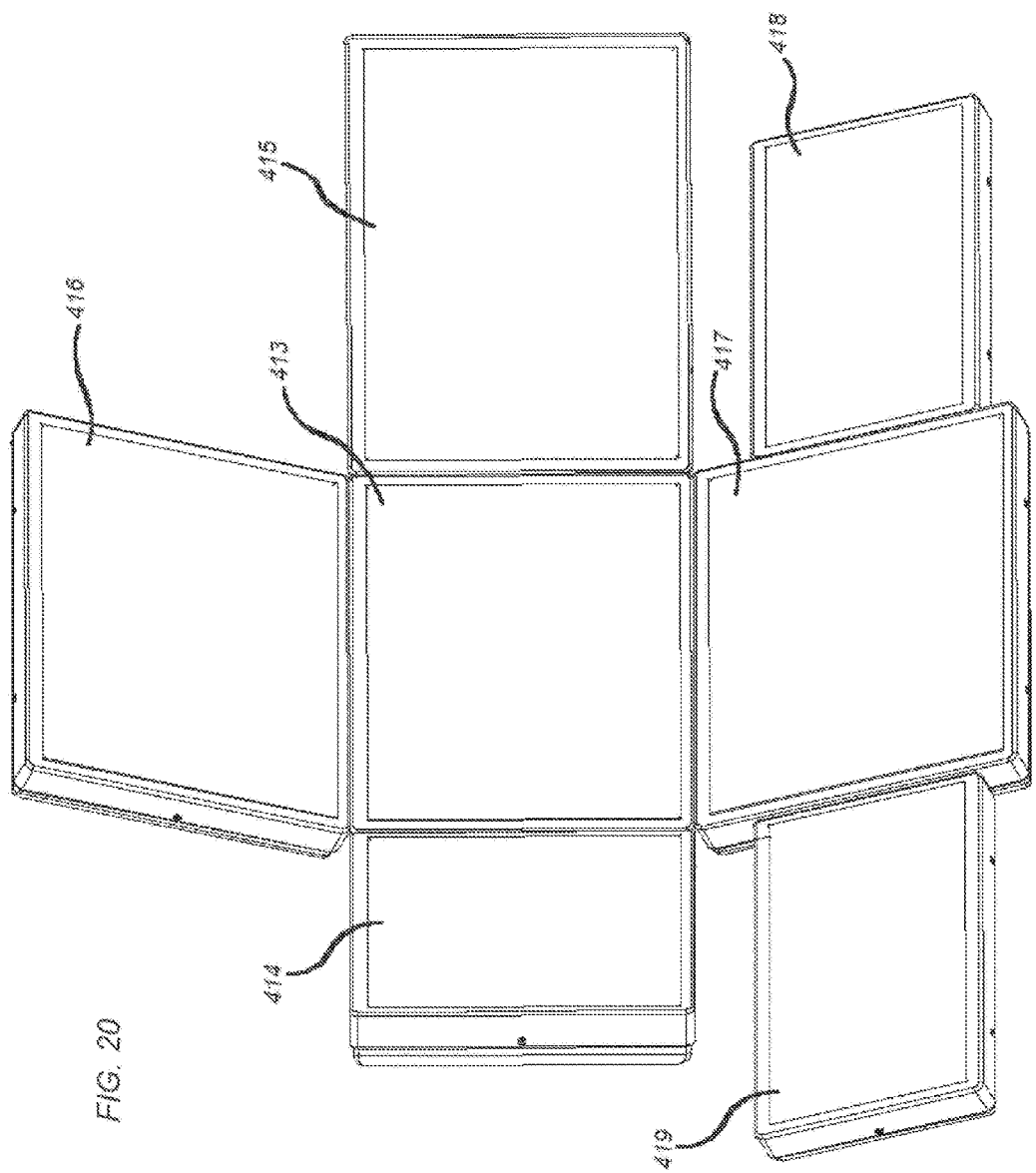
FIG. 20 is a detailed view of an embodiment of the first system monitoring station and its monitors or displays of the type illustrated in FIG. 18.

FIG. 20 shows a detailed view of an embodiment of the first monitoring station display as depicted in FIG. 18. This monitoring display is configured to provide a structural geometry that emulates the arrangement of the first system camera array 384, while also providing visual data from the rearward-facing camera 385 and the second system articulating camera 386. The center monitor 413 is surrounded by other monitors that display a left view 414, a right view 415, an upward view 416, and a downward view 417. The view from the rearward-facing camera 385 is displayed on a corresponding monitor 418, while the view from the second system articulating camera 386 is displayed on an additional monitor 419.

Figure 21:
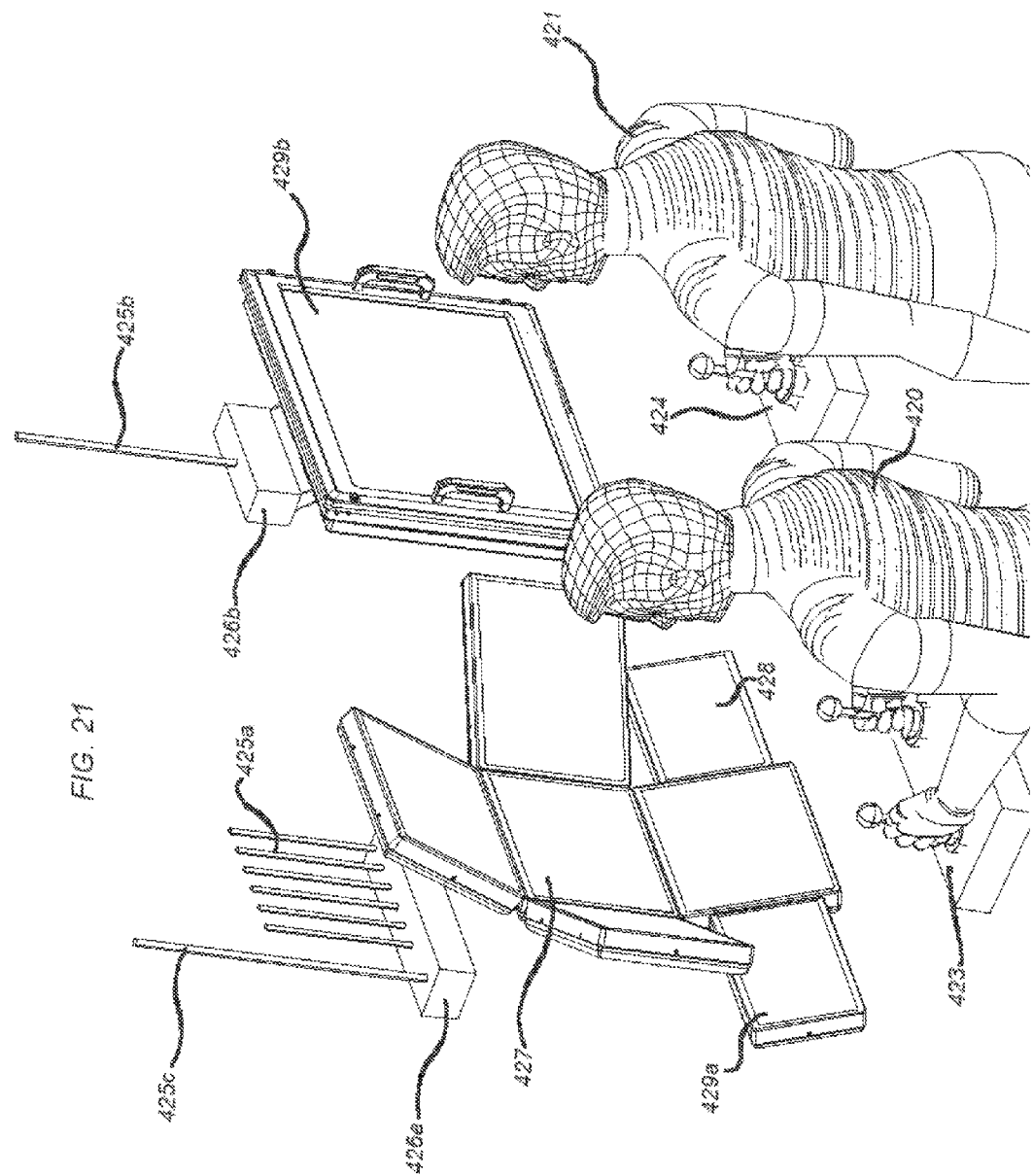
FIG. 21 is a perspective view of an embodiment of a monitoring and display station, depicting a pilot and a secondary system operator who is assisting the pilot by providing augmented visual data through control of the secondary system.

FIG. 21 details an embodiment of a monitoring ground station where a pilot 420 and operator assisting the pilot 421 work together to control an unmanned aircraft system. The pilot maneuvers the aircraft via a remote controller 423, while the operator assisting the pilot 421 manipulates an airborne articulating camera via his controller 424.

Transmissions from the aircraft are captured by antennas 425a 425b 425c and fed to downlink receivers 426a and 426b. The pilot 420 views the first system camera array feeds on a center cluster of monitors 427 along with the rearward-camera monitor 428, while at the same time referencing critical visual information provided by the second system articulating camera 429a that is controlled by the operator assisting the pilot. The operator assisting the pilot 421 views visual information provided by the second system articulating camera on his monitor display 429b.

Figure 22:
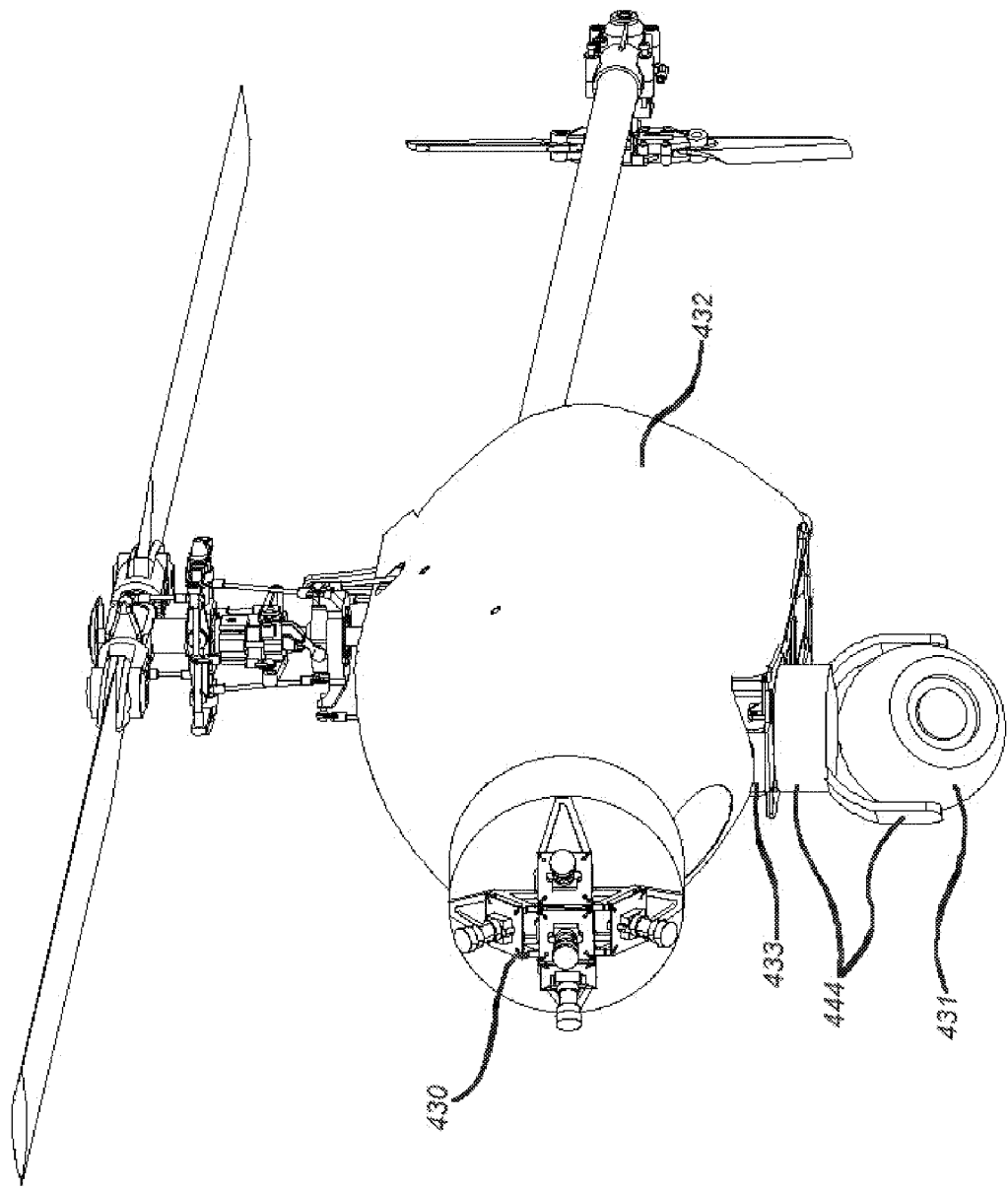
FIG. 22 is a perspective view of an embodiment of a first and second system camera or sensor arrangement on an unmanned aerial vehicle, where the second system is an articulating single sensor and lens device.

An embodiment of a two-tiered first camera or sensor system and second camera or sensor system are depicted in FIG. 22. A fixed multi-camera array 430 is attached to the nose of the unmanned aircraft 432, while an additional motor powered gimbal 444 with articulating single camera 431 is attached below the aircraft. In this illustration a vibration isolation system 433 is employed.

Figure 23:
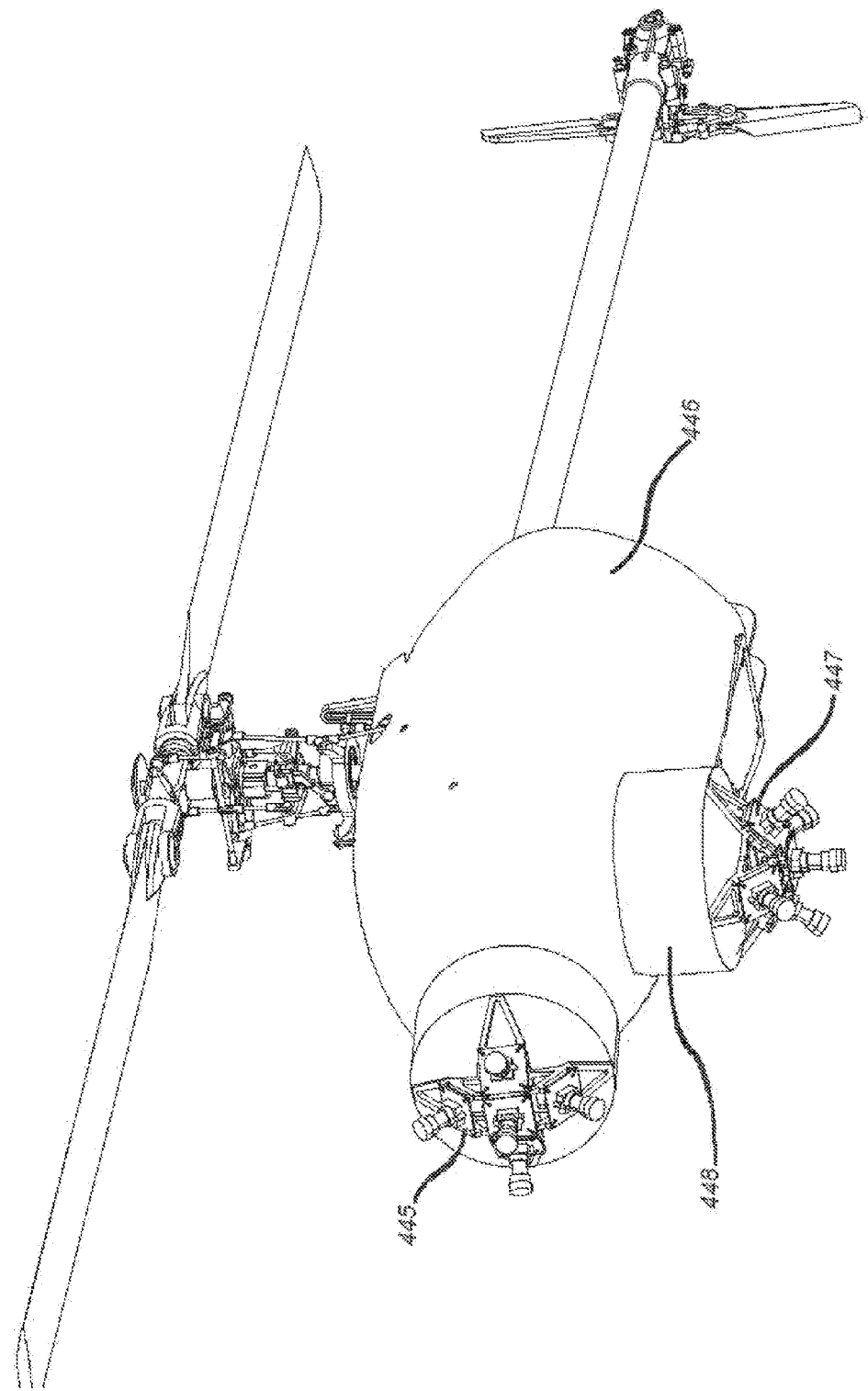
FIG. 23 is a perspective view of an embodiment of a first and second system camera or sensor arrangement on an unmanned aerial vehicle, where the second system is a fixed multiple sensor and lens device.

FIG. 23 illustrates an embodiment of a two-tiered first camera or sensor system and second camera or sensor system. A fixed multi-camera array 445 is attached to the nose of the unmanned aircraft 447, while an additional fixed multi-camera array 447 is attached below the aircraft. In this variant, the second system overlaps imagery generated by the first system, while also providing congruent or incongruent visual information in field-of-view areas that the first system does not support. The second system consists of sensors and/or lenses that can be identical, similar or dissimilar to the first system, providing the same or differing spectral wavelength information and/or field of views as the first system. In this example, the second system camera array support mechanism 448 is movable on the vertical axis, providing a means of retracting the second system camera array 447 into the body of the aircraft 446 for protective, aerodynamic, or other reasons.

Figure 24:
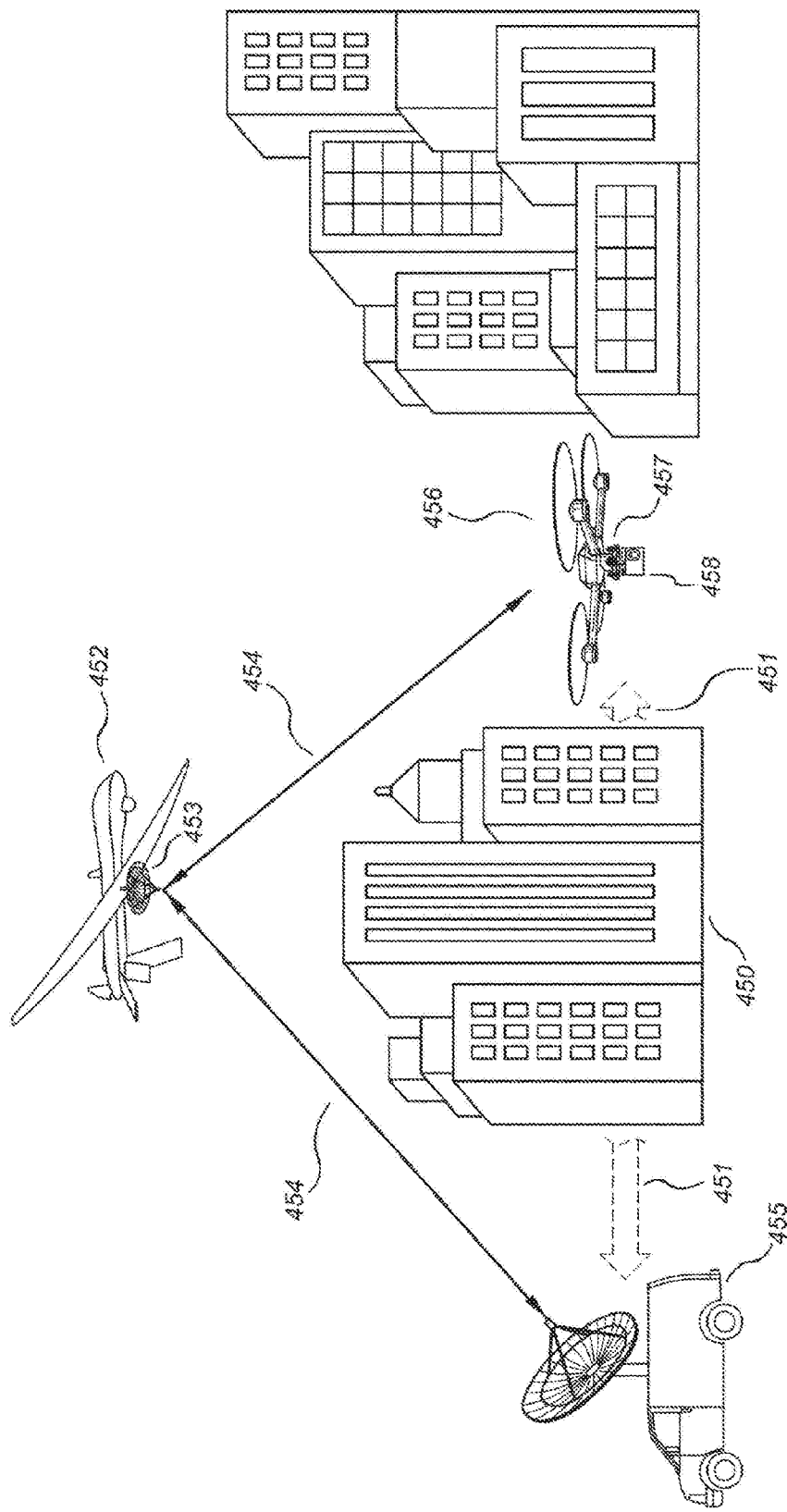
FIG. 24 is a schematic representation of a multi-sensor array unmanned aerial vehicle and ground station utilizing an airborne repeater aircraft to augment radio transmission.

FIG. 24 depicts a scenario where direct line-of-sight wireless transmission is not possible because a barrier of tall buildings 450 impedes radio signal reception 451. To overcome this, a repeater manned aircraft or repeater unmanned aerial vehicle ("UAV") 452 is utilized, hosting an airborne antenna/transmitter/receiver system 453, relaying video downlinks along with aircraft command and control uplinks 454 between a mobile ground station 455 and a multi-sensor (camera) array UAV 456 carrying a first system multi-sensor array 457 and a second system video camera 458.

Figure 25:
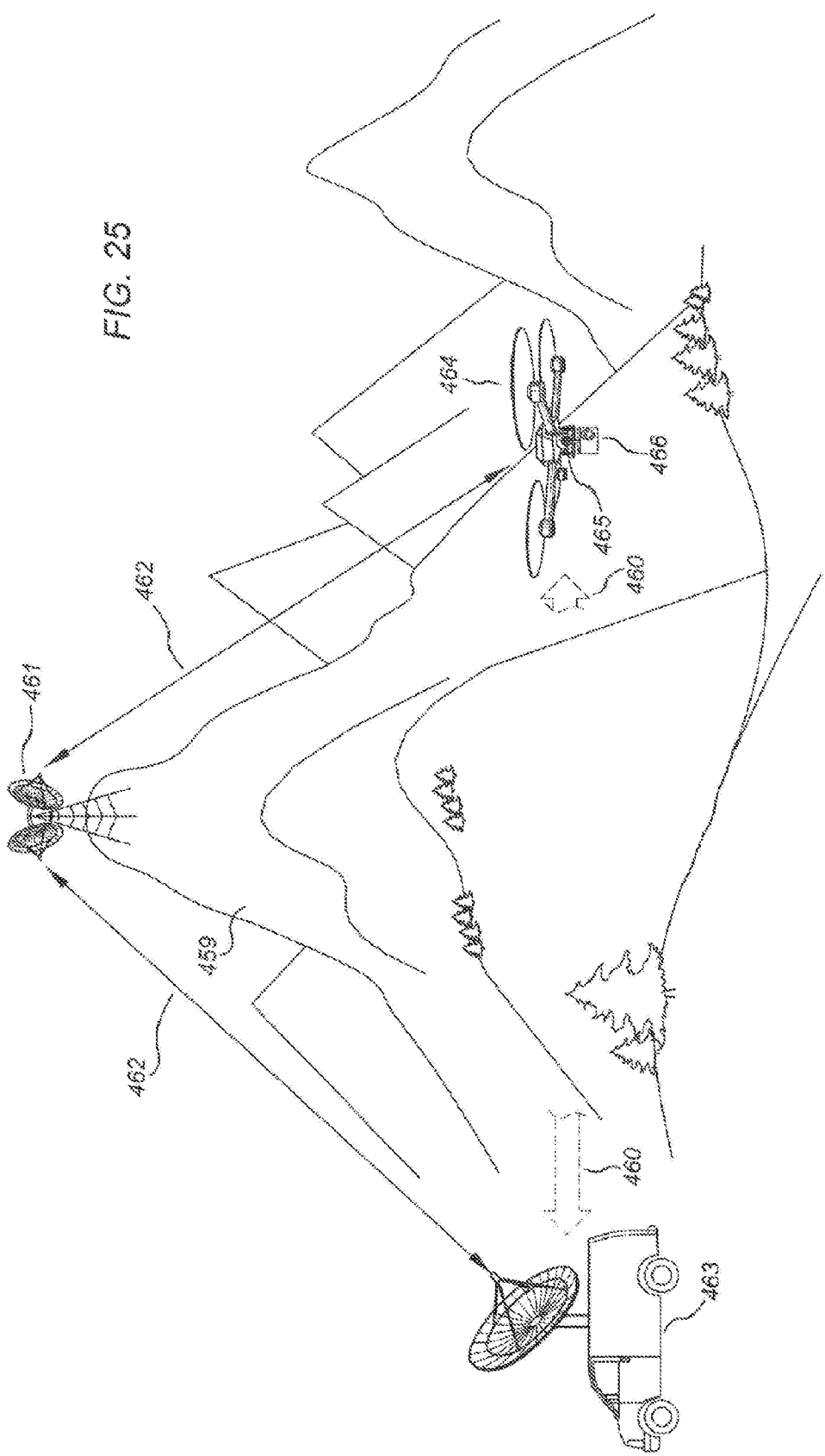
FIG. 25 is a schematic representation of a multi-sensor array unmanned aerial vehicle and ground station utilizing a ground-based repeater to augment radio transmission.

FIG. 25 depicts a scenario where direct line-of-sight wireless transmission is not possible because a barrier of high terrain 459 impedes radio signal reception 460. To overcome this, a repeater station 461 is utilized, situated atop a mountain, relaying video downlinks and aircraft command and control uplinks 462 between a mobile ground station 463 and a multi-sensor (camera) array UAV 464 carrying a first system multi-sensor array 465 and a second system video camera 466.

Figure 26:
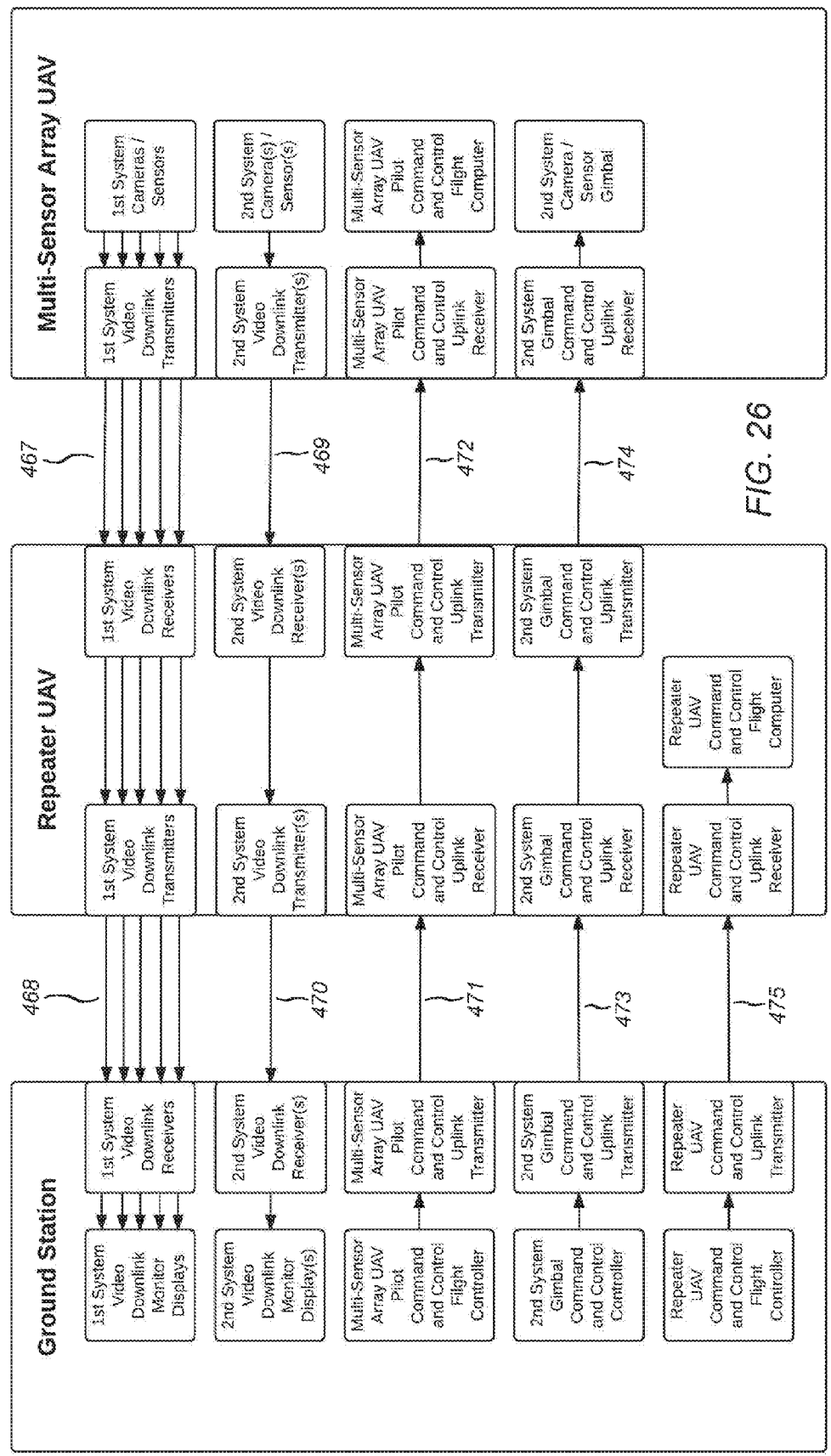
FIG. 26 is a diagram depicting an embodiment of a transmission configuration when utilizing a repeater unmanned aerial vehicle.

FIG. 26 is a diagram that details an embodiment where a repeater UAV is used to relay multiple video downlinks along with aircraft command and control uplinks between a ground station and a multi-sensor (camera) array UAV that hosts a first system multi-sensor array and a second system articulating video camera.

Multiple video signals from the first system multi-sensor array are transmitted between the multi-sensor UAV and the repeater UAV 467, the feeds relayed between a receiver and transmitter onboard the repeater UAV, then transmitted between the repeater UAV and the ground station 468, where they are fed to corresponding monitor displays. The video signal from second system video camera is transmitted between the multi-sensor array UAV and the repeater UAV 469, the feed relayed between a receiver and transmitter onboard the repeater UAV, then transmitted between the repeater UAV and the ground station 470, where it is fed to a monitor display.

Aircraft command and control signals generated from the multi-sensor UAV pilot's controller are transmitted from the ground station to the repeater UAV 471, the feed relayed between a receiver and transmitter onboard the repeater UAV, then transmitted to the multi-sensor UAV 472, where it is fed to the multi-sensor UAV flight computer for flight control of the multi-sensor UAV. Second system camera gimbal command and control signals generated from the second system operator's controller are transmitted from the ground station to the repeater UAV 473, the feed relayed between a receiver and transmitter onboard the repeater UAV, then transmitted to the multi-sensor UAV 474, where it is fed to the second system camera gimbal for camera articulation. Command and control signals for the repeater UAV are transmitted from the ground station to the repeater UAV 475, where it is fed to the repeater UAV flight computer for flight control of the repeater UAV.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An unmanned aerial drone ("UAD") for capturing payload video and navigation video, comprising:
   a navigation system for controlling the movement of the UAD, comprising:
      a first wireless receiver, in communication with the navigation system, configured to receive and respond to navigation commands from a first monitoring system at a ground station;
      a first imaging system comprising:
         a plurality of navigation cameras attached to and pointing out from the UAD and positioned so as to capture navigation video from a point of view of the UAD; and
         a first wireless transmitter configured to transmit the navigation video to the first monitoring system at the ground station; and
   a payload system for capturing payload video comprising:
      a second wireless receiver, in communication with the payload system, configured to receive rotational commands from a second monitoring system at the ground station;
      a rotating mount attached to the UAD and configured to:
         rotate on a horizontal axis independent of a movement of the UAD;
         rotate on a vertical axis independent of the movement of the UAD; and
         respond to the rotational commands received by the second wireless receiver;
      a second imaging system comprising:
         a payload camera attached to the rotating mount configured to capture payload video; and
         a second wireless transmitter configured to transmit the payload video to the second monitoring system at the ground station.

2. The UAD for capturing payload video and navigation video of claim 1, wherein the first monitoring system comprises a display for each of the plurality of navigation cameras configured to be in alignment with each of the plurality of navigation cameras.

3. The UAD for capturing payload video and navigation video of claim 1 wherein the first wireless transmitter transmits on an array of antennas and the second wireless transmitter transmits on a single antenna.

4. The UAD for capturing payload video and navigation video of claim 1, wherein the first wireless receiver and the second wireless receiver are the same wireless receiver.

5. The UAD for capturing payload video and navigation video of claim 1, wherein the rotating mount is a gimbal mount.

6. The UAD for capturing payload video and navigation video of claim 1, wherein each of the plurality of navigation cameras has its own antenna.

7. The UAD for capturing payload video and navigation video of claim 1, wherein the plurality of navigation cameras comprise a plurality of first digital sensors or a plurality of first digital sensor systems and the payload camera comprises a second digital sensor or a second digital sensor system.

8. The UAD for capturing payload video and navigation video of claim 1, wherein:
the first monitoring system is configured to:
receive navigation video; and
display navigation video;
the second monitoring system is configured to:
receive payload video; and
display payload video.

9. The UAD for capturing payload video and navigation video of claim 8, wherein the first monitoring system has a display for each of the plurality of navigation cameras configured to be in alignment with each of the plurality of navigation cameras.

10. The UAD for capturing payload video and navigation video of claim 8, wherein the first wireless transmitter transmits on an array of antennas and the second wireless transmitter transmits on a single antenna.

11. The UAD for capturing payload video and navigation video of claim 8, wherein the first wireless receiver and the second wireless receiver are the same wireless receiver.

12. The UAD for capturing payload video and navigation video of claim 8, wherein the rotating mount is a gimbal mount.

13. The UAD for capturing payload video and navigation video of claim 8, wherein the plurality of navigation cameras comprise a plurality of first digital sensors or a plurality of first digital sensor systems and the payload camera comprises a second digital sensor or a second digital sensor system.

14. A method for capturing navigation video and payload video utilizing an unmanned aerial drone ("UAD"), comprising:
receiving navigation commands from a first monitoring system at a ground station;
controlling the movement of the UAD in response to the navigation commands;
capturing navigation video from a plurality of navigation cameras attached to and positioned around the exterior of the aerial drone;
transmitting the navigation video to the first monitoring system at the ground station;
receiving rotational commands from a second monitoring system at the ground station;
in response to the rotational commands, moving a rotating mount attached to the UAD wherein the rotating mount is configured to rotate on a horizontal axis independent of a movement of the UAD and rotate on a vertical axis independent of the movement of the UAD;
capturing payload video from a payload camera attached to the rotating mount; and
transmitting the payload video to the second monitoring system at the ground station.

15. The method for capturing navigation video and payload video utilizing an unmanned aerial drone ("UAD") of claim 14, wherein the first monitoring system comprises a display for each of the plurality of navigation cameras configured to be in alignment with each of the plurality of navigation cameras.

16. The method for capturing navigation video and payload video utilizing an unmanned aerial drone ("UAD") of claim 14, wherein the first wireless transmitter transmits using an array of antennas and the second wireless transmitter uses a single antenna.

17. The method for capturing navigation video and payload video utilizing an unmanned aerial drone ("UAD") of claim 14, wherein the navigation commands and the rotational commands are received on the same receiver.

18. The method for capturing navigation video and payload video utilizing an unmanned aerial drone ("UAD") of claim 14, wherein the rotating mount is a gimbal mount.

19. The method for capturing navigation video and payload video utilizing an unmanned aerial drone ("UAD") of claim 14, wherein each of the plurality of navigation cameras has its own antenna.

20. The method for capturing navigation video and payload video utilizing an unmanned aerial drone ("UAD") of claim 14, wherein the plurality of navigation cameras comprise a plurality of first digital sensors or a plurality of first digital sensor systems and the payload camera comprises a second digital sensor or a second digital sensor system.

* * * * *